United States Patent
Jaeger et al.

(10) Patent No.: US 11,323,702 B2
(45) Date of Patent: May 3, 2022

(54) APPARATUS AND A METHOD FOR ASSOCIATING A VIDEO BLOCK PARTITIONING PATTERN TO A VIDEO CODING BLOCK

(71) Applicant: Huawei Technologies Co., Ltd., Shenzhen (CN)

(72) Inventors: Fabian Jaeger, Aachen (DE); Jacek Konieczny, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 15/194,197

(22) Filed: Jun. 27, 2016

(65) Prior Publication Data
US 2016/0345007 A1    Nov. 24, 2016

Related U.S. Application Data

(63) Continuation of application No. PCT/EP2014/055666, filed on Mar. 20, 2014.

(51) Int. Cl.
*H04N 19/115* (2014.01)
*H04N 19/176* (2014.01)
(Continued)

(52) U.S. Cl.
CPC ........... *H04N 19/115* (2014.11); *G06T 9/20* (2013.01); *H04N 19/119* (2014.11);
(Continued)

(58) Field of Classification Search
CPC .. H04N 19/115; H04N 19/119; H04N 19/136; H04N 19/176; H04N 19/182;
(Continued)

(56) References Cited

U.S. PATENT DOCUMENTS 5,898,798 A  *  4/1999  Bouchard et al. ....... G06K 9/48
                                                                    382/242
9,609,343 B1 *  3/2017  Chen et al. ............ H04N 19/50
(Continued)

FOREIGN PATENT DOCUMENTS

CN          1217124 A    5/1999
CN          103069802 A    4/2013
(Continued)

OTHER PUBLICATIONS

Fabian Jager, CE3: Results on Depth-based Block Paritioning (DBBP), Jan. 17, 2013 (Year: 2013).*
(Continued)

*Primary Examiner* — Joseph G Ustaris
*Assistant Examiner* — Jimmy S Lee
(74) *Attorney, Agent, or Firm* — Leydig, Voit & Mayer, Ltd.

(57) ABSTRACT

Embodiments of the invention relates to an apparatus for associating a video block partitioning pattern to a video coding block, wherein the apparatus comprises: an obtainer adapted to obtain values of a set of segmentation mask samples, wherein each segmentation sample of the set of segmentation mask samples represents a different position in a segmentation mask adapted to define video coding block partitions of the video coding block; a selector adapted to select a video block partitioning pattern from a predetermined group of video block partitioning patterns based on the values of segmentation mask samples of the set of segmentation mask samples; and
an associator adapted to associate the selected video block partitioning pattern to the video coding block.

23 Claims, 16 Drawing Sheets

(51) Int. Cl.
| | |
|---|---|
| *H04N 19/119* | (2014.01) |
| *H04N 19/182* | (2014.01) |
| *H04N 19/21* | (2014.01) |
| *H04N 19/136* | (2014.01) |
| *G06T 9/20* | (2006.01) |
| *H04N 19/597* | (2014.01) |
| *H04N 19/50* | (2014.01) |

(52) U.S. Cl.
CPC ......... *H04N 19/136* (2014.11); *H04N 19/176* (2014.11); *H04N 19/182* (2014.11); *H04N 19/21* (2014.11); *H04N 19/50* (2014.11); *H04N 19/597* (2014.11)

(58) Field of Classification Search
CPC ...... H04N 19/21; H04N 19/50; H04N 19/597; G06T 9/20
USPC .................................................. 375/240.12
See application file for complete search history.

(56) References Cited

U.S. PATENT DOCUMENTS

| | | | |
|---|---|---|---|
| 2006/0028686 A1* | 2/2006 | Bergman et al. ......... | G06K 9/00 358/2.1 |
| 2013/0208982 A1* | 8/2013 | Bordes et al. ............ | G06T 9/00 382/173 |
| 2013/0322529 A1* | 12/2013 | Henry .................. | H04N 19/105 375/240.12 |
| 2014/0247876 A1* | 9/2014 | Moriya et al. ......... | H04N 19/91 375/240.12 |
| 2014/0307780 A1* | 10/2014 | Cohen et al. ........ | H04N 19/124 375/240.03 |

FOREIGN PATENT DOCUMENTS

| | | |
|---|---|---|
| WO | 2013065402 A1 | 5/2013 |
| WO | 2013106190 A1 | 7/2013 |

OTHER PUBLICATIONS

Fabian Jager, CE3: Results on Depth-based Block Partitioning (DBBP),Jan. 17, 2013 (Year: 2013).*

Mani et al., "A Fast Block Motion Estimation Algorithm Based on Motion Adaptive Partitioning," (2000).

Jager et al., "Depth-based Block Partitioning for 3D Video Coding," PCS 2013, pp. 410-413, Institute of Electrical and Electronics Engineers, New York, New York (2013).

Jager et al., "CE3-related: Depth-based Block Partitioning," Document: JCT3V-E0118, Joint Collaborative Team on 3D Video Coding Extensions of ITU-T SG 16 WP 3 and ISO/IEC JTC 1/SC 29/WG 11, 5$^{th}$ Meeting: Vienna, Austria (Jul. 27-Aug. 2, 2013).

Jager et al., "CE3: Results on Depth-based Block Partitioning (DBBP)," Document JCT3V-G0106, Joint Collaborative Team on 3D Video Coding Extensions of ITU-T SG 16 WP 3 and ISO/IEC JTC 1/SC 29/WG 11, 7$^{th}$ Meeting: San Jose, California (Jan. 11-17, 2013).

Jager et al., "Low Complex Partitioning Derivation for DBBP," Document JCT3V-H0058, Joint Collaborative Team on 3D Video Coding Extensions of ITU-T SG 16 WP 3 and ISO/IEC JTC 1/SC 29/WG 11, 8$^{th}$ Meeting: Valencia, Spain (Mar. 29-Apr. 4, 2014).

Park et al., "Simplification of DBBP in 3D-HEVC," Document JCT3V-H0068, Joint Collaborative Team on 3D Video Coding Extensions of ITU-T SG 16 WP 3 and ISO/IEC JTC 1/SC 29/WG 11, 8$^{th}$ Meeting: Valencia, Spain (Mar. 29-Apr. 4, 2014).

Hung et al., "On Macroblock Partition for Motion Compensation," ICIP 2006, pp. 1697-1700, Institute of Electrical and Electronics Engineers, New York, New York (2006).

Guo et al., "Simplified Geometry-Adaptive Block Partitioning for Video Coding," Proceedings of the 2010 IEEE 17$^{th}$ International Conference on Image Processing, Hong Kong, pp. 965-968, Institute of Electrical and Electronics Engineers, New York, New York (Sep. 26-29, 2010).

Darb-Esfahani et al., "Use of a prefabricated object segmentation for improving a grid-based prediction in a moving image encoder," Study Task, Technische Universitat Berlin (Apr. 17, 1998).

Tech et al., "3D-HEVC Draft Text 2," Document JCT3V-F1001-v4, Joint Collaborative Team on 3D Video Coding Extension Development of ITU-T SG 16 WP 3 and ISO/IEC JTC 1/SC 29/WG 11, 6$^{th}$ Meeting: Geneva, Switzerland (Oct. 25-Nov. 1, 2013).

CN/20148006975.2, Office Action and Search Report, dated Feb. 25, 2019.

* cited by examiner

APPARATUS AND A METHOD FOR ASSOCIATING A VIDEO BLOCK PARTITIONING PATTERN TO A VIDEO CODING BLOCK

CROSS-REFERENCE TO RELATED APPLICATIONS

This application is a continuation of International Application No. PCT/EP2014/055666, filed on Mar. 20, 2014, which is hereby incorporated by reference in its entirety.

TECHNICAL FIELD

Embodiments of the invention relate to the field of video coding.

BACKGROUND

In modern video codecs, a video frame of a video signal can be divided into video coding blocks, also denoted as macro-blocks or coding units. The video coding blocks can be partitioned into video coding block partitions having regular or irregular shapes.

An exemplary block partitioning technique which can provide irregularly shaped video coding block partitions is depth-based block partitioning (DBBP). In depth-based block partitioning (DBBP), the shape of the video coding block partitions is determined upon the basis of depth information of the video coding block. For indicating the video coding block partitions of the video coding block, a segmentation mask is provided.

In order to enable an efficient processing of an irregularly shaped video coding block partition, e.g. for motion estimation or prediction purposes, a virtual partitioning technique for mapping a video block partitioning pattern onto a segmentation mask can be applied. Common techniques, such as cross-correlation based techniques, however, suffer from a high computational complexity which can limit the attainable coding efficiency of modern video codecs.

In F. Jaeger, "Depth-based Block Partitioning for 3D Video Coding", Picture Coding Symposium (PCS), 2013, a depth-based block partitioning approach is described.

In L. Guo, P. Yin, Y. Zheng, X. Lu, Q. Xu, J. Sole, "Simplified Geometry-Adaptive Block Partitioning for Video Coding", IEEE ICIP, 2010, a statistical block partitioning approach is described.

In E. M. Hung, R. L. De Queiroz, D. Mukherjee, "On Macroblock Partition for Motion Compensation", IEEE ICIP, 2006, a block partitioning approach based on edge detection is described.

SUMMARY

It is an object of the embodiments of the invention to provide an efficient method for associating a video block partitioning pattern to a video coding block.

This object is achieved by the features of the independent claims. Further embodiments are apparent from the dependent claims, the description and the figures.

Embodiments of the invention are based on the finding that a video block partitioning pattern can be selected from a group of video block partitioning patterns upon the basis of a number of values of samples within a segmentation mask associated to the video coding block. The samples are be arranged at predetermined positions within the segmentation mask, e.g. at corner areas or border areas of the segmentation mask. The values of the samples can collectively indicate the video block partitioning pattern. Therefore, only a small number of values of samples of the segmentation mask are processed in order to select the video block partitioning pattern, e.g., only four to six values are processed to map any video coding block partition to a group of 6 predetermined video coding block partitioning patterns.

The selection of the video block partitioning pattern can be realized using a decision tree, wherein pairs of values can be compared for equality or inequality. The selection of the video block partitioning pattern can further be realized using logical gates, wherein the values can be combined by combinational logic to indicate the video block partitioning pattern. The selection of the video block partitioning pattern can further be realized using a look-up table, wherein the look-up table can comprise predetermined combinations of values to indicate the video block partitioning pattern. The decision tree, the logical gates, or the look-up table are possible realizations of a decision rule for selecting the video block partitioning pattern based on values of samples of the segmentation mask at predetermined positions. The decision tree, the logical gates, or the look-up table can efficiently be realized for a segmentation mask having binary values using standard digital circuitry.

In order to describe embodiments of the invention, the following terms, abbreviations and notations will be used (among others):
AVC—Advanced Video Coding
HEVC—High-Efficiency Video Coding
CU—Coding Unit
DBBP—Depth-Based Block Partitioning Video sequence: a set of subsequent images or pictures, also referred to as frames in the context of video, presenting a motion picture.

3D video: a signal comprising texture images or views and their at least one corresponding depth or disparity map.

Visual scene: a real world or synthetic scene that is represented in the 3D video.

Depth map: a gray scale image or picture in which value of every point of the picture determines a distance to the camera of the visual scene represented by this point. Alternatively, a disparity map may be used, which values are inversely proportional to the ones of the depth map.

Texture image: an image or picture acquired from a specified viewpoint containing information about color and texture of the visual scene; usually represented in RGB or YUV format.

Coded block: a coding unit, usually of regular, rectangular shape, describing an encoded area of the image using syntax specified for a coding mode selected for the block.

Coding mode: describes a set of means and methods used to encode the coded block of an image.

Reference block: a block of an image which is already decoded prior to a currently processed block and is used as a reference for predictive coding of the current block.

According to a first aspect, embodiments of the invention relate to an apparatus for associating a video block partitioning pattern to a video coding block, wherein the apparatus comprises: an obtainer adapted to obtain values of segmentation mask samples, wherein each segmentation sample of the set of segmentation mask samples represents a different position in a segmentation mask adapted to define video coding block partitions of the video coding block; a selector adapted to select a video block partitioning pattern from a predetermined group of video block partitioning patterns based on the values of segmentation mask samples of the set of segmentation mask samples; and an associator adapted to associate the selected video block partitioning pattern to the video coding block.

The selector can be configured to select the video block partitioning pattern from the group of video block partitioning patterns e.g. using a decision tree, logical gates, or a look-up table. By using a decision tree, pairs of values, e.g. a pair of the first value and the second value, can be compared for equality or inequality. The decision tree can be implemented upon the basis of IF-THEN-ELSE conditional statements. By using logical gates, values, e.g. the first value and the second value, can be combined by combinational logic to indicate the video block partitioning pattern. The logical gates can be implemented upon the basis of AND-OR logical statements. By using a look-up table, predetermined combinations of values, e.g. of the first value and of the second value, can be used to indicate the video block partitioning pattern.

The associator can be configured to associate the selected video block partitioning pattern to the video coding block. Each video block partitioning pattern of the group of video block partitioning patterns can be indexed by a predetermined index number. The associator can be configured to associate the index number of the selected video block partitioning pattern to the video coding block.

Thus, a predetermined video block partitioning pattern can efficiently be associated to a video coding block for any kind of partition, e.g. for regular and irregular partitions, defined by the segmentation mask associated to the video coding block.

The video coding block can be part of a video frame. The video coding block can comprise texture information and depth information. The video coding block partitions can have regular or irregular shapes.

The texture information and the depth information can be part of separate video frames, i.e. there can be a first video frame comprising the texture information and a second video frame comprising the corresponding depth information. The video coding block can relate to the first video frame and/or the second video frame. The video coding block in the first video frame can comprise the texture information and the video coding block in the second video frame can comprise the corresponding depth information.

The predetermined group of video block partitioning patterns can comprise a plurality of video block partitioning patterns. The video block partitioning pattern can have a regular shape, in particular a rectangular shape. The video block portioning patterns of the predetermined group of video block partitioning patterns may also be referred to as predetermined video block partitioning patterns.

The segmentation mask is associated to the video coding block. The segmentation mask samples indicate the segments of the segmentation mask and the video coding block partitions of the video coding block. The value is the same for every sample within the same segment and is different from the values assigned to the other segments within the video coding block.

In a first implementation form of the apparatus according to the first aspect, the video coding block partitions of the video coding block have an irregular shape, in particular a non-rectangular shape, and/or wherein the video block partitioning patterns of the predetermined group of video block partitioning patterns have a regular shape, in particular a rectangular shape.

The irregularly shaped video coding block partitions can be determined using a block partitioning technique, e.g. depth-based block partitioning (DBBP). The predetermined regularly shaped video block partitioning patterns relate to a virtual partitioning of the video coding block, wherein the virtual partitioning of the video coding block represents the non-regular partitioning of the video coding block.

In a second implementation form of the apparatus according to the first aspect as such or the first implementation form of the first aspect, the predetermined group of video block partitioning patterns comprises at least one of the following video block partitioning patterns: a video block partitioning pattern for horizontally partitioning the video coding block at one quarter of the height of the video coding block, a video block partitioning pattern for horizontally partitioning the video coding block at one half of the height of the video coding block, a video block partitioning pattern for horizontally partitioning the video coding block at three quarters of the height of the video coding block, a video block partitioning pattern for vertically partitioning the video coding block at one quarter of the width of the video coding block, a video block partitioning pattern for vertically partitioning the video coding block at one half of the width of the video coding block, or a video block partitioning pattern for vertically partitioning the video coding block (301) at three quarters of the width of the video coding block.

In a third implementation form of the apparatus according to the first aspect as such or any of the preceding implementation forms of the first aspect, a first segmentation sample and a second segmentation mask sample of the set of segmentation samples represent adjacent corner positions of the segmentation mask or video coding block; or a first segmentation sample and a second segmentation mask sample of the set of segmentation samples represent positions in corner areas at adjacent corners of the segmentation mask or video coding block, wherein the corner areas relate to an area extending from the corner by a fourth of the width of the video coding block in horizontal direction and by a fourth of the height of the video coding block in vertical direction.

The corner areas can be located at an upper or top left of the segmentation mask, an upper or top right of the segmentation mask, a lower or bottom left of the segmentation mask, or a lower or bottom right of the segmentation mask. The corner areas can comprise a plurality of samples of the segmentation mask. The corner areas can comprise the corners of the segmentation mask.

In a fourth implementation form of the apparatus according to the first aspect as such or any of the preceding implementation forms of the first aspect, wherein a third segmentation sample and a fourth segmentation mask sample of the set of segmentation samples represent border positions at opposite horizontal borders of the segmentation mask or video coding block and/or represent border positions which are centrally symmetrical to a center of the segmentation mask; and wherein a fifth segmentation sample and a sixth segmentation mask sample of the set of segmentation samples represent border positions at opposite vertical borders of the segmentation mask or video coding block and/or represent border positions which are centrally symmetrical to a center of the segmentation mask; or wherein a third segmentation sample and a fourth segmentation mask sample of the set of segmentation samples represent positions in border areas at opposite horizontal borders of the segmentation mask, wherein each of the border areas relate to an area extending from the border by a fourth of the height of the segmentation block or video coding block in vertical direction, and/or only relate to an area extending from the half of the width of the segmentation mask or video coding block by a fourth of the width of the segmentation block or video coding block in horizontal direction, wherein these horizontal border areas extending from the half of the width extend in opposite horizontal directions to each other; and wherein a fifth segmentation sample and a sixth segmentation mask sample of the set of segmentation samples represent positions in border areas at opposite vertical borders of the segmentation mask, wherein the border areas relate to an area extending from the border by a fourth of the width of the segmentation mask in horizontal direction, and may additionally only relate to an area extending from the half of the height of the segmentation mask by a fourth of the height of the segmentation mask in vertical direction, wherein these vertical border areas extending from the half of the height extend in opposite vertical directions to each other.

In a fifth implementation form of the apparatus according to the first aspect as such or any of the preceding implementation forms of the first aspect, a first segmentation sample of the set of segmentation samples represents a top left corner position of the segmentation mask, a second segmentation sample of the set of segmentation samples represents a bottom left or top right corner position of the segmentation mask, a third segmentation sample of the set of segmentation samples represents a top border sample at an horizontal N/4−1, N/4, N/2, N−1−N/2 (N/2−1), ¾N or N−1−N/4 (¾N−1) sample position (e.g. counted from left to right in the horizontal direction) of the segmentation mask, a fourth segmentation sample of the set of segmentation samples represents a bottom border sample at an horizontal N/4−1, N/4, N/2, N−1−N/2 (N/2−1), ¾N or N−1−N/4 (¾N−1) sample position (e.g. counted from left to right in the horizontal direction) of the segmentation mask, preferably at an position centrally symmetric to the horizontal position of the third segmentation sample; a fifth segmentation sample of the set of segmentation samples represents a left border sample at an vertical N/4−1, N/4, N/2, N−1−N/2 (N/2−1), ¾N or N−1−N/4 (¾N−1) sample position (e.g. counted top down in the vertical direction) of the segmentation mask, and a sixth segmentation sample of the set of segmentation samples represents a right border sample at an horizontal N/4−1, N/4, N/2, N−1−N/2 (N/2−1), ¾N or N−1−N/4 (¾N−1) sample position (e.g. counted top down in the vertical direction) of the segmentation mask, preferably at an position centrally symmetric to the vertical position of the fourth segmentation sample.

In a sixth implementation form of the apparatus according to the first aspect as such or any of the preceding implementation forms of the first aspect, the segmentation mask samples have binary values for indicating the video coding block partitions.

Thus, the selecting of the video block partitioning pattern from the group of video block partitioning patterns can be implemented efficiently.

A first binary value, e.g. 0, can indicate a first video coding block partition. The first binary value can further indicate that the segmentation mask sample belongs to the first video coding block partition. A second binary value, e.g. 1, can indicate a second video coding block partition. The second binary value can further indicate that the segmentation mask sample belongs to the second video coding block partition. In further implementation forms the first binary value can be 1 and the second binary value can be 0.

In a seventh implementation form of the apparatus according to the first aspect as such or any of the preceding implementation forms of the first aspect, the apparatus further comprises an inverter adapted to invert the binary values of the segmentation mask samples.

Thus, the video block partitioning pattern can be selected from a further increased number of video block partitioning patterns of the predetermined group of video block partitioning patterns.

Inverting the binary values of the segmentation mask can be realized by replacing the first binary value of segmentation mask samples, e.g. 0, by the second binary value of segmentation mask samples, e.g. 1, and vice versa.

In an eighth implementation form of the apparatus according to the first aspect as such or any of the preceding implementation forms of the first aspect, the apparatus further comprises: a down-sampler adapted to down-sample a spatial resolution of the segmentation mask by a predetermined down-sampling factor. Thus, the number of samples of the segmentation mask can be reduced.

The down-sampling of the segmentation mask can comprise a low-pass filtering of the segmentation mask. The predetermined down-sampling factor can be a number, e.g. 2 or 4.

In a ninth implementation form of the apparatus according to the first aspect as such or any of the preceding implementation forms of the first aspect, wherein the video coding block comprises texture information and depth information, wherein a sample of the depth information indicates a depth or disparity of a sample of the texture information; and wherein the obtainer is adapted to obtain the values of the set of segmentation mask samples based on the depth information.

The obtainer can be configured to obtain the segmentation mask sample values based on the depth information. The obtainer can be configured to determine a threshold value, e.g. by averaging values of samples of the depth information, and to compare values of samples of the depth information with the threshold value to obtain values of the segmentation mask samples. Thus, the video coding block partitions can relate to depth information of the video coding block.

The depth information can be a depth map or a disparity map. The depth information can comprise a plurality of samples, where each sample of depth information corresponds to predefined number of texture samples, e.g. single pixel, 2×2 pixel block or 4×4 pixel block. The depth information can indicate a depth or a disparity. The texture information can be a texture map. The texture information can comprise a plurality of samples.

The texture information and the depth information can have different spatial resolution. The depth information can be scaled in order to adapt the texture information. A position of a sample of the depth information can be determined in order to correspond to a position of a sample of the texture information.

In a tenth implementation form of the apparatus according to the first aspect as such or any of the preceding implementation forms of the first aspect, the apparatus is a video coder, e.g. a video encoder or a video decoder.

According to a second aspect, embodiments of the invention relate to a method for associating a video block partitioning pattern to a video coding block, wherein the method comprises: obtaining values of segmentation mask samples, wherein each segmentation sample of the set of segmentation mask samples represents a different position in a segmentation mask adapted to define video coding block partitions of the video coding block; selecting a video block partitioning pattern from a predetermined group of video block partitioning patterns based on the values of segmentation mask samples of the set of segmentation mask samples; and associating the selected video block partitioning pattern to the video coding block.

In a first implementation form of the method according to the second aspect, the video coding block partitions of the video coding block have an arbitrary, e.g. an irregular shape and/or a non-rectangular shape, and/or wherein the video block partitioning patterns of the predetermined group of video block partitioning patterns have a regular shape, e.g. a rectangular shape.

In a second implementation form of the method according to the second aspect as such or the first implementation form of the second aspect, the predetermined group of video block partitioning patterns comprises at least one of the following video block partitioning patterns: a video block partitioning pattern for horizontally partitioning the video coding block at one quarter of the height of the video coding block, a video block partitioning pattern for horizontally partitioning the video coding block at one half of the height of the video coding block, a video block partitioning pattern for horizontally partitioning the video coding block at three quarters of the height of the video coding block, a video block partitioning pattern for vertically partitioning the video coding block at one quarter of the width of the video coding block, a video block partitioning pattern for vertically partitioning the video coding block at one half of the width of the video coding block, or a video block partitioning pattern for vertically partitioning the video coding block at three quarters of the width of the video coding block.

In a third implementation form of the method according to the second aspect as such or any of the preceding implementation forms of the second aspect, a first segmentation sample and a second segmentation mask sample of the set of segmentation samples represent adjacent corner positions of the segmentation mask or video coding block; or a first segmentation sample and a second segmentation mask sample of the set of segmentation samples represent positions in corner areas at adjacent corners of the segmentation mask or video coding block, wherein the corner areas relate to an area extending from the corner by a fourth of the width of the video coding block in horizontal direction and by a fourth of the height of the video coding block in vertical direction.

In a fourth implementation form of the method according to the second aspect as such or any of the preceding implementation forms of the second aspect, a third segmentation sample and a fourth segmentation mask sample of the set of segmentation samples represent border positions at opposite horizontal borders of the segmentation mask or video coding block and/or represent border positions which are centrally symmetrical to a center of the segmentation mask; and a fifth segmentation sample and a sixth segmentation mask sample of the set of segmentation samples represent border positions at opposite vertical borders of the segmentation mask or video coding block and/or represent border positions which are centrally symmetrical to a center of the segmentation mask; or a third segmentation sample and a fourth segmentation mask sample of the set of segmentation samples represent positions in border areas at opposite horizontal borders of the segmentation mask, wherein each of the border areas relate to an area extending from the border by a fourth of the height of the segmentation block or video coding block in vertical direction, and/or only relate to an area extending from the half of the width of the segmentation mask or video coding block by a fourth of the width of the segmentation block or video coding block in horizontal direction, wherein these horizontal border areas extending from the half of the width extend in opposite horizontal directions to each other; and a fifth segmentation sample and a sixth segmentation mask sample of the set of segmentation samples represent positions in border areas at opposite vertical borders of the segmentation mask, wherein the border areas relate to an area extending from the border by a fourth of the width of the segmentation mask in horizontal direction, and/or relate to an area extending from the half of the height of the segmentation mask by a fourth of the height of the segmentation mask in vertical direction, wherein these vertical border areas extending from the half of the height extend in opposite vertical directions to each other.

In a fifth implementation form of the method according to the second aspect as such or any of the preceding implementation forms of the second aspect, a first segmentation sample of the set of segmentation samples represents a top left corner position of the segmentation mask, a second segmentation sample of the set of segmentation samples represents a bottom left or top right corner position of the segmentation mask, a third segmentation sample of the set of segmentation samples represents a top border sample at an horizontal $N/4-1$, $N/4$, $N/2$, $N-1-N/2$ ($N/2-1$), $\frac{3}{4}N$ or $N-1-N/4$ ($\frac{3}{4}N-1$) sample position (e.g. counted from left to right in the horizontal direction) of the segmentation mask, a fourth segmentation sample of the set of segmentation samples represents a bottom border sample at an horizontal $N/4-1$, $N/4$, $N/2$, $N-1-N/2$ ($N/2-1$), $\frac{3}{4}N$ or $N-1-N/4$ ($\frac{3}{4}N-1$) sample position (e.g. counted from left to right in the horizontal direction) of the segmentation mask, preferably at an position centrally symmetric to the horizontal position of the third segmentation sample; a fifth segmentation sample of the set of segmentation samples represents a left border sample at an vertical $N/4-1$, $N/4$, $N/2$, $N-1-N/2$ ($N/2-1$), $\frac{3}{4}N$ or $N-1-N/4$ ($\frac{3}{4}N-1$) sample position (e.g. counted top down in the vertical direction) of the segmentation mask, and a sixth segmentation sample of the set of segmentation samples represents a right border sample at an horizontal $N/4-1$, $N/4$, $N/2$, $N-1-N/2$ ($N/2-1$), $\frac{3}{4}N$ or $N-1-N/4$ ($\frac{3}{4}N-1$) sample position (e.g. counted top down in the vertical direction) of the segmentation mask, preferably at an position centrally symmetric to the vertical position of the fourth segmentation sample.

In a sixth implementation form of the method according to the second aspect as such or any of the preceding implementation forms of the second aspect, the segmentation mask samples have binary values for indicating the video coding block partitions.

In a seventh implementation form of the method according to the second aspect as such or any of the preceding implementation forms of the second aspect, the method further comprises inverting the binary values of the segmentation mask samples.

In an eighth implementation form of the method according to the second aspect as such or any of the preceding implementation forms of the second aspect, the method further comprises: down-sampling a spatial resolution of the segmentation mask by a predetermined down-sampling factor.

In a ninth implementation form of the method according to the second aspect as such or any of the preceding implementation forms of the second aspect, the video coding block comprises texture information and depth information, wherein a sample of the depth information indicates a depth or disparity of a sample of the texture information; and wherein the obtainer is adapted to obtain the values of the set of segmentation mask samples based on the depth information.

In a tenth implementation form of the method according to the second aspect as such or any of the preceding implementation forms of the second aspect, the method relates to video coding, e.g. video encoding or a video decoding.

The explanations with regard to the apparatus according to the first aspect and its implementations forms equally apply to the method according to the second aspect and its corresponding implementation forms.

According to a third aspect, embodiments of the invention relate to an apparatus comprising a processor, wherein implementation forms of the processor are adapted to perform the method according to the second aspect or any of its implementation forms.

According to a fourth aspect, embodiments of the invention relate to a computer program comprising a program code for performing the method according to the second aspect as such or any implementation form of the second aspect when executed on a computer. Thus, the method can be performed in an automatic and repeatable manner.

The computer program can be provided in form of a machine-readable code. The computer program can comprise a series of commands for a processor of the computer. The processor of the computer can be configured to execute the computer program. The computer can comprise a processor, a memory, and/or input/output means.

The computer program can be executed by the obtainer, the selector and/or the associator of the apparatus according to the first aspect as such or any implementation form of the first aspect.

The computer program can further be executed by the processor of the apparatus according to the third aspect as such or any implementation form of the third aspect.

According to a fifth aspect, embodiments of the invention relate to a computer readable storage medium comprising the computer program according to the fourth aspect as such. Thus, the computer program can be stored and executed efficiently.

Further implementation forms of the computer readable storage medium according to the fifth aspect comprise computer programs according to implementation forms of the fourth aspect.

Embodiments of the invention can be implemented in hardware and/or software.

Further embodiments of the invention will be described with respect to the following figures, in which.

Identical reference signs refer to identical or at least equivalent features.

DETAILED DESCRIPTION

Figure 1:
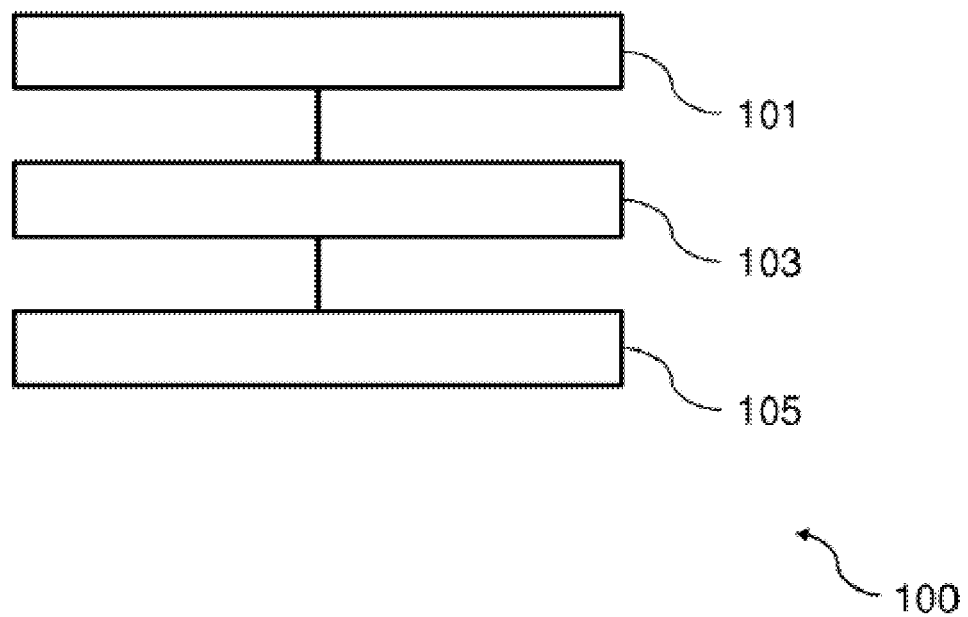
FIG. 1 shows a diagram of a method for associating a video block partitioning pattern to a video coding block according to an implementation form.

FIG. 1 shows a diagram of a method 100 for associating a video block partitioning pattern to a video coding block according to an embodiment.

The method 100 comprises obtaining 101 values of a set of segmentation mask samples, e.g. a value of each segmentation mask sample, wherein each segmentation sample of the set of segmentation mask samples represents a different position in a segmentation mask adapted to define video coding block partitions of the video coding block. As will be explained later, e.g. depending on the embodiments, a value of each segmentation mask sample of the predetermined number of segmentation mask samples is obtained (e.g. for the 4 point pattern embodiments or for the 6 point pattern look-up table or gate embodiments) or only values of those segmentation mask samples, which are required based on a previous evaluation (e.g. for 6 point pattern decision tree embodiments).

The value of each segmentation mask sample of the plurality segmentation mask samples indicates to which segment the segmentation mask sample belongs or refers to. In other words, a first sample value, e.g. 0, indicates that the segmentation sample belongs to a first segment of the segmentation mask and refers to a first video coding block partition corresponding to the first segment. A second sample value, e.g. 1, indicates that the segmentation sample belongs to a second segment of the segmentation mask and refers to a second video coding block partition corresponding to the second segment, and so forth. Binary segmentations masks are defined by two segmentation sample values only, a first and second segmentation sample value.

Figure 5:
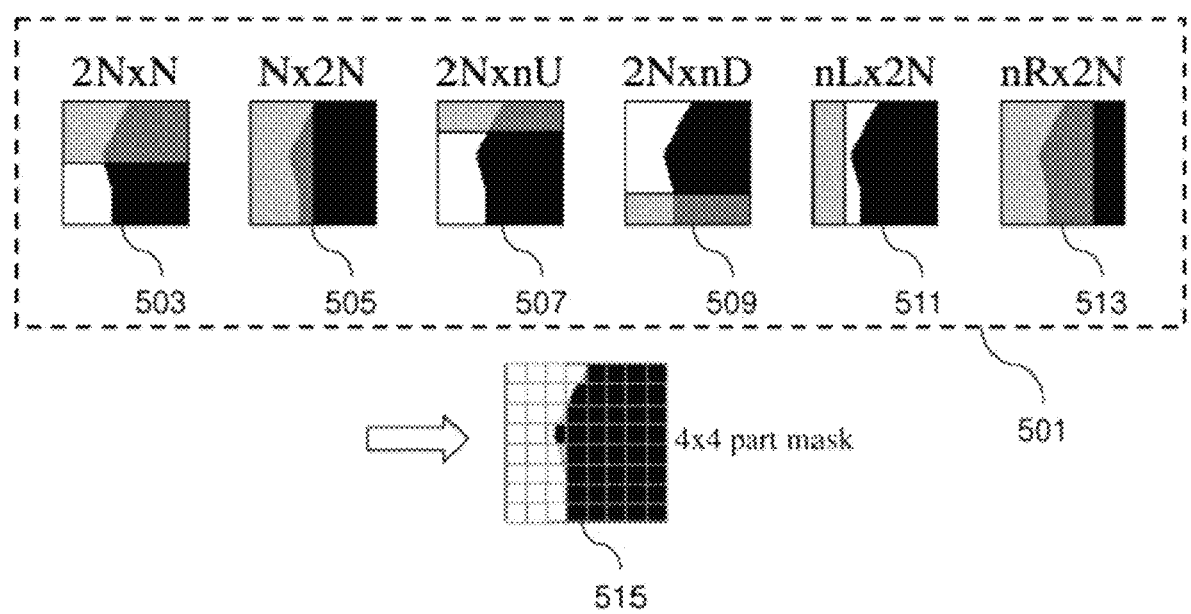
FIG. 5 shows a diagram of a predetermined group of video block partitioning patterns according to an implementation form.
Figure 6:
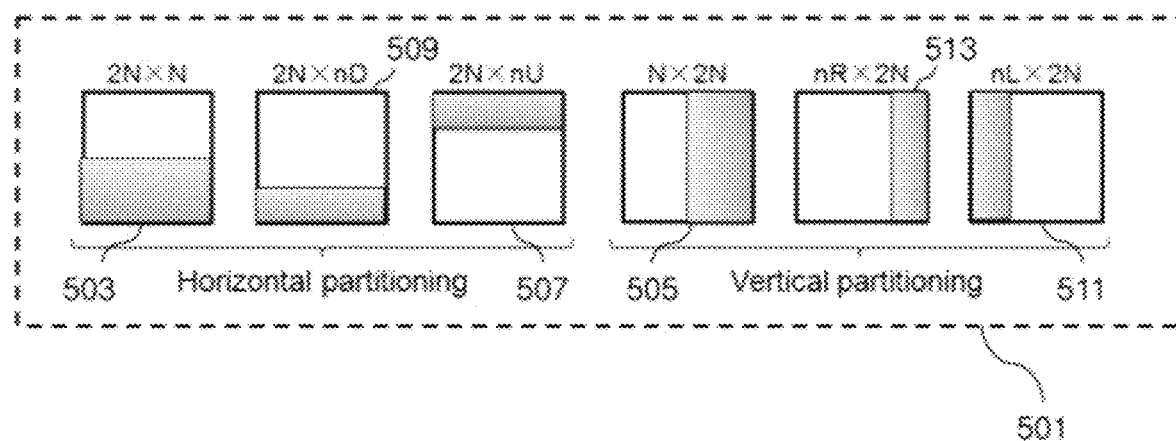
FIG. 6 shows a diagram of a predetermined group of video block partitioning patterns according to an implementation form.

The method further comprises selecting 103 a video block partitioning pattern from a predetermined group of video block partitioning patterns, e.g. as exemplarily explained in more detail based on FIGS. 5 and 6, based on the values of segmentation mask samples of the set of segmentation mask samples.

The method 100 further comprises associating 105 the selected video block partitioning pattern to the video coding block.

The video coding block can be part of a video frame. The video coding block can comprise texture information and depth information. The video coding block partitions can have regular or irregular shapes.

The predetermined group of video block partitioning patterns can comprise a plurality of video block partitioning patterns. The video block partitioning pattern can have a regular shape, in particular a rectangular shape.

The segmentation mask is associated to the video coding block. The segmentation mask samples, which can correspond to a predefined number of texture samples, e.g. single pixel, 2×2 pixel block or 4×4 pixel block, indicate the video coding block partitions of the video coding block.

The selection of the video block partitioning pattern can be realized using a decision tree, wherein pairs of values can be compared for equality or inequality. The selection of the video block partitioning pattern can further be realized using logical gates, wherein the values can be combined by combinational logic to indicate the video block partitioning pattern. The selection of the video block partitioning pattern can further be realized using a look-up table, wherein the look-up table can comprise predetermined combinations of values to indicate the video block partitioning pattern.

Further embodiments of the method 100 are described below with regard to FIGS. 3 to 10.

Figure 2:
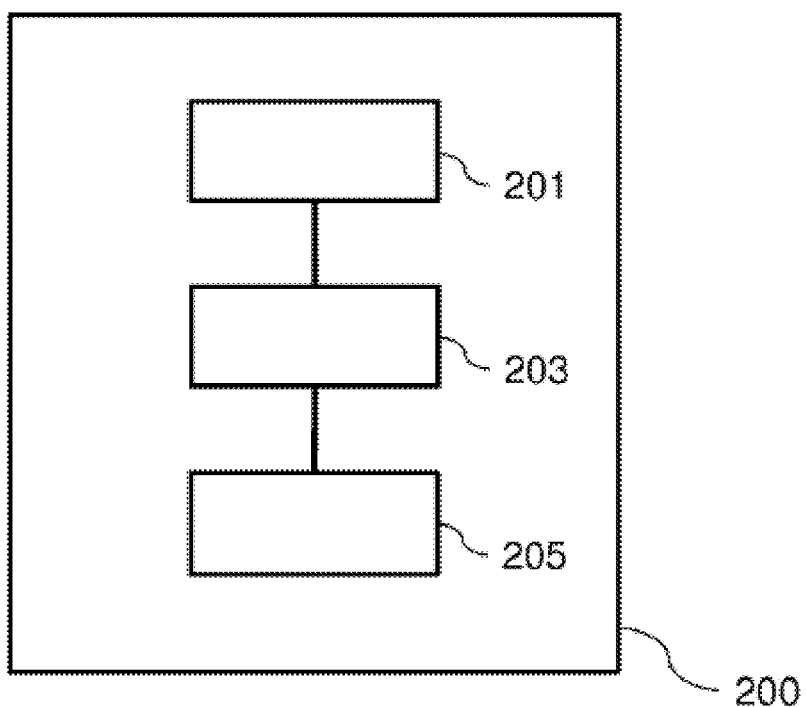
FIG. 2 shows a diagram of an apparatus, e.g. a video coder, for associating a video block partitioning pattern to a video coding block according to an implementation form.

FIG. 2 shows a diagram of an embodiment of an apparatus 200, e.g. a video coder 200, for associating a video block partitioning pattern to a video coding block according to an embodiment. The embodiment of the apparatus 200 comprises an obtainer 201, a selector 203 and an associator 205.

The obtainer 201 is adapted to obtain values, wherein each segmentation sample of the set of segmentation mask samples represents a different position in a segmentation mask adapted to define video coding block partitions of the video coding block.

The selector 203 is adapted to select a video block partitioning pattern from a predetermined group of video block partitioning patterns based on the values of segmentation mask samples of the set of segmentation mask samples.

The associator 205 is adapted to associate the selected video block partitioning pattern to the video coding block.

The apparatus 200 can be a video coder 200, and in particular a video decoder or a video encoder.

The obtainer 201 can be configured to extract the first segmentation mask sample and the second segmentation mask sample from the segmentation mask to obtain the first value of the first segmentation mask sample and the second value of the second segmentation mask sample.

The selector 203 can be configured to select the video block partitioning pattern from the group of video block partitioning patterns e.g. using a decision tree, logical gates, or a look-up table. By using a decision tree, pairs of values, e.g. a pair of the first value and the second value, can be compared for equality or inequality. The decision tree can be implemented upon the basis of IF-THEN-ELSE conditional statements. By using logical gates, values, e.g. the first value and the second value, can be combined by combinational logic to indicate the video block partitioning pattern. The logical gates can be implemented upon the basis of AND-OR logical statements. By using a look-up table, predetermined combinations of values, e.g. of the first value and of the second value, can be used to indicate the video block partitioning pattern.

The associator 205 can be configured to associate the selected video block partitioning pattern to the video coding block. Each video block partitioning pattern of the group of video block partitioning patterns can be indexed by a predetermined index number. The associator 205 can be configured to associate the index number of the selected video block partitioning pattern to the video coding block.

Embodiments of the apparatus 200 are adapted to perform embodiments of the method 100 of FIG. 1. Further features of the video coder 200 can directly result from the functionality of the method 100 of FIG. 1.

Further embodiments of the apparatus 200 are described below with regard to FIGS. 3 to 10.

Figure 3:
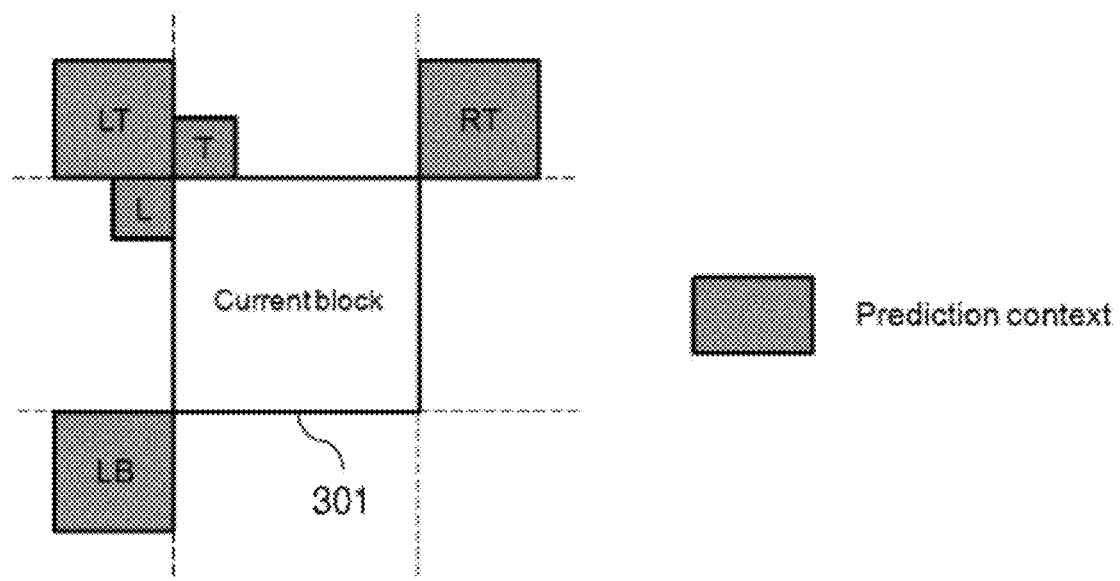
FIG. 3 shows a diagram of a video coding block and video coding block partitions of neighboring video coding blocks according to an implementation form.

FIG. 3 shows a diagram of a video coding block 301 and video coding block partitions of neighboring video coding blocks according to an embodiment. The video coding block partitions of the current video coding block can, for example, refer to a prediction context of the neighboring video coding block 301. The video coding block partitions of the current video coding blocks can refer to a left (L), top (T), left-top (LT), right-top (RT), and left-bottom (LB) partition of the neighboring video coding blocks.

Embodiments of the invention relate to the field of computer vision, in particular to the topics referred to as 3D video processing and 3D video coding. In 3D video signals, depth information can be represented as a set of depth maps that correspond to texture information of each video frame. The intensity or value of each sample of the depth map describes the distance from the camera of the visual scene represented by this sample. Alternatively, a disparity map can be used, which values are inversely proportional to the ones of the depth map and describe the difference in location in the image plane of the same point of the visual scene projected into image planes of the two views constituting a stereo-pair.

In 3D video coding, a depth map for each view can be encoded besides the conventional texture information or video data. To preserve backward compatibility for non-3D codecs, the texture information for the base-view can be encoded first. The order of coding remaining components can be adjusted. There can be two main coding orders utilized: texture-first and depth-first which can provide an opportunity to exploit inter-component, i.e. texture-depth, dependencies to increase the overall coding performance of the 3D video codec. The texture-first coding order can enable advanced texture dependent coding tools to be used for coding depth information. On the other hand, the depth-first coding order can enable advanced depth dependent coding tools for coding texture information. Embodiments of the invention can be applied using both coding orders.

In standards for 3D video coding, e.g. 3D-HEVC, the texture-first coding order is used in the common test conditions (CTC). However, even in case of texture-first coding an approximation of the depth information of the coded view can be available during the coding of the texture information, determined as a virtual depth information synthesized from other, e.g. reference, views.

In video codecs, an encoded video frame can be divided into small parts, called video coding blocks (e.g. 4×4, 8×8, 16×16, 32×32, 64×64), macro-blocks, or coding units. In the coding process, an encoder can decide about a coding mode for each part, including the possibility to divide each video coding block or part into smaller sub-parts. This process is referred to as block partitioning. As a result, each video coding block can comprise one or more video coding block partitions. Blocks of texture images and depth maps are coded treated in the same way but may have different spatial resolutions.

In specific video codecs, a regular, e.g. rectangular, shape of video coding block partitions is allowed. However, the shape of the video coding block partitions can be arbitrarily adjusted to an encoded video content. The adjustment is done by dividing the video coding block partition into smaller ones, e.g. two vertical or horizontal halves, or four quarters. In an approach that can use irregular shaped video coding block partitions, called depth-based block partitioning (DBBP), the arbitrary shape of the video coding block partitions can be determined based on depth information associated with the coded texture information block.

In video codecs, e.g. MPEG-2, AVC or HEVC, the currently processed video coding block 301 can be coded using prediction mechanisms to increase the coding performance. The prediction can be realized based on the values assigned to a rectangular partition of a neighboring video coding block that is closest to the predicted video coding block 301. In particular, already coded partitions of the neighboring video coding blocks located above and to the left of the current video coding block 301 can be used for prediction of the current video coding block 301 and its video coding block partitions, constituting a context for coding syntax elements, e.g. motion vectors, for the current video coding block 301 and its video coding block partitions as shown in FIG. 3.

Additionally, for each partition, part and/or sub-part a prediction mode can be selected. As predictive coding is an efficient approach of encoding video signals or content, for each partition of the coded video coding block 301 a reference block, or a partition of the reference block if it has been further divided, which has already been encoded prior to the coded video coding block 301, is selected. Such a video coding block is set as a reference for the coded video coding block 301 and only a prediction error with respect to this reference video coding block is signaled in the bitstream of the encoded video signal. A reference video coding block can be selected from the video coding blocks of the same video frame as the coded video coding block 301 or one of previously coded video frames. In the first case, an intra prediction, i.e. intra-frame prediction, can be utilized. In the latter case, an inter prediction, i.e. inter-frame prediction, can be used.

In the intra prediction, each partition of the coded video coding block 301 can be predicted using a selected directional predictor. In the inter prediction, an approach known as motion estimation can be applied, which uses motion vectors to specify the spatial location of the sample in the reference video frame relatively to the spatial position of the coded video coding block 301 in the current video frame. The motion vector points to the image area of the reference image, i.e. to the reconstructed (decoded) samples and can be different from the regular coding block grid (e.g. its borders can go through two or more coding blocks). Also, the reference video frame is specified, which is indicated, for example, by a reference video frame index. For each partition of the coded video coding block 301, an independent set of motion vectors and reference video frame indices can be selected by the encoder. Consequently, the inter prediction of each partition can be different. Finally, a prediction error or residuum, i.e. a difference between the prediction of the coded video coding block and the original coded video coding block can be encoded and transmitted in the bitstream.

The combined coding of 3D video pursues the goal to exploit inter-component dependencies to increase an overall coding performance. As a result, different approaches can be employed. Such inter-component dependencies can be computed in both directions, i.e. texture-to-depth and depth-to-texture, and can result in improving the overall coding efficiency by utilizing the inter-component dependencies.

Figure 4:
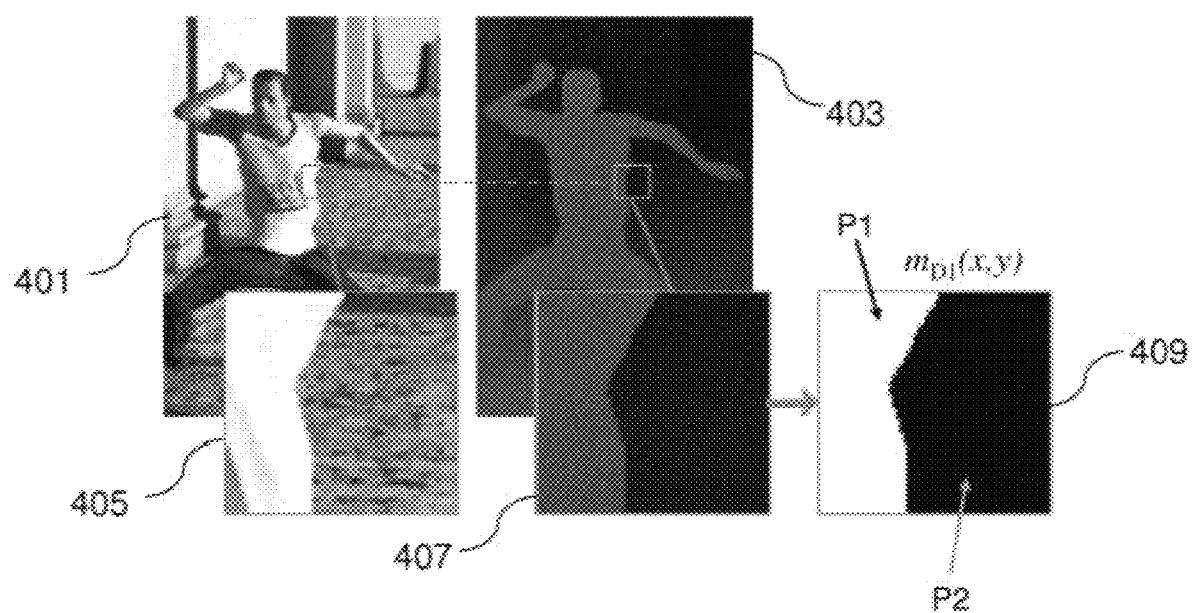
FIG. 4 shows a diagram of texture information and depth information of a video frame according to an implementation form.

FIG. 4 shows an exemplary diagram of texture information 401 and depth information 403, e.g. a depth map 403 associated to the texture frame 401, of a video frame according to an embodiment. The diagram further shows texture information 405, depth information 407, e.g. depth values 407, and a segmentation mask 409 of or associated to a first video coding block of the video frame.

The segmentation mask 409 of the video coding block comprises two segments or video coding block partitions, a first segment or first video coding block partition P1, and a second segment or second video coding block partition P2. The segmentation mask 409 of the video coding block relates to a function $m_{D1}(x, y)$ as will be explained later in more detail for a general segmentation mask $m_D(x, y)$.

The diagram relates to a block partitioning referred to as depth-based block partitioning (DBBP). The diagram shows, from the left, coded texture information 401, 405, associated depth information 403, 407, e.g. disparity maps, and the resultant block partitioning in form of segmentation mask 409 comprising two video coding block P1 and P2 according to $m_{D1}(x, y)$.

The inter-component dependencies can be used to determine an arbitrary shape of video coding block partitions of the video coding blocks to further improve compression efficiency by better adjusting the shape of coded video coding blocks or units to the actual shape of objects in the visual scene. For this purpose, one can utilize a depth information component to determine a shape of video coding block partitions, as the object borders are well preserved in depth maps, see for example the borders in 403 and 407.

In the following, an embodiment of the invention comprising determining and utilizing an irregular shape of video coding block partitioning, e.g. based on depth-based block partitioning (DBBP), is described. DBBP allows to introduce an irregular shape of video coding block partitions that can be determined based on depth information associated with the coded video coding block to improve the texture information coding. Each video coding block in DBBP mode can be divided into a predefined number, e.g. two, of irregular shape partitions or segments. The irregular video block partitioning is approximated by rectangular video coding block partitioning for the purpose of constituting a prediction context for neighboring video coding blocks. Such approximation is also called virtual partitioning. With virtual partitioning, a current video coding block can reference an irregular shape partition of the reference neighboring video coding block in the same way as a regular shape partition. This approach makes the implementation of the coding tools using the irregular shape partitioning, e.g. DBBP, much less complex. Additionally, the integration with existing codecs, like HEVC, is also much less complex.

For determining the segmentation mask 409 upon the basis of the depth information 407, e.g. in form of depth maps, a thresholding mechanism can be performed according to the following equation:

$$\bar{d} = \frac{1}{(2N)^2} \sum_{x=0}^{2N-1} \sum_{y=0}^{2N-1} d(x, y)$$

In this equation, $\bar{d}$ denotes a threshold and corresponds to a mean depth map value, 2N denotes a width and/or a height of a video coding block, and d(x, y) denotes corresponding depth information, e.g. corresponding depth values, 407.

A binary segmentation mask $m_D(x, y)$ can be generated based on $\bar{d}$ according to the following equation:

$$m_D(x, y) = \begin{cases} 1, & \text{if } d(x, y) \geq \bar{d}, \\ 0, & \text{otherwise} \end{cases}, x, y \in [0, 2N-1]$$

In other words, according to the above embodiment, a mean depth value d is determined based on the depth values of the depth map associated to the video coding block, these depth values are compared to this mean depth value d, and are set to a first binary value, here the binary "1", in case the depth value is equal or larger than the mean depth value d, and are set to a second binary value, here the binary "0", in case the depth value is smaller than the mean depth value d, wherein the first binary value indicates that the corresponding segmentation mask sample belongs to the first partition, e.g. P1, and wherein the second binary value indicates that the corresponding segmentation mask sample belongs to the second partition, e.g. P2.

Non-binary segmentation masks, comprising three or more segments can be determined, e.g. either by determining 2 or more thresholds to divide the depth values in three or more depth value ranges, each depth value range associated to one of the three or more segments, or by further dividing a partition by another binary segmentation mask based on the above algorithm, i.e. determining a mean depth value for the depth values of the specific partition and assigning the segmentation samples to one of the two sub-segments based on the comparison of the depth values with the mean depth value.

FIGS. 5 and 6 show a diagram of an exemplary predetermined group 501 of video block partitioning patterns 503, 505, 507, 509, 511, 513 according to an embodiment, e.g. the group of non-square partitioning modes or video block partitioning patterns as used in HEVC. The group comprises six different rectangular partitioning patterns, wherein the video block partitioning patterns 503, 507 and 509 form three horizontal partitioning patterns and the video block partitioning patterns 505, 511 and 513 form three vertical partitioning patterns.

The diagram in FIG. 5 further shows at the bottom a down-sampled segmentation mask 515 in which each sample of 515 relates to a 4×4-sample block or part of the original non-down-sampled segmentation mask, each sample having a binary sample value, "0" or "1" indicating to which partition the 4×4-sample block of the original non-down-sampled segmentation mask belongs to.

The video block partitioning pattern 503 is adapted for horizontally partitioning the video coding block at one half of the height of the video coding block and is also referred to as 2N×N video block partitioning pattern. In other words, the video block partitioning pattern 503 partitions the video coding block into two partitions, an upper half partition covering the upper half area of the video coding block and a lower half partition covering the lower half area of the video coding block.

The video block partitioning pattern 505 is adapted for vertically partitioning the video coding block at one half of the width of the video coding block and is also referred to as N×2N video block partitioning pattern. In other words, the video block partitioning pattern 505 partitions the video coding block into two partitions, a left half partition covering the left side half area of the video coding block and a right half partition covering the right side half area of the video coding block.

The video block partitioning pattern 507 is adapted for horizontally partitioning the video coding block at three quarters of the height of the video coding block and is also referred to as 2N×nU video block partitioning pattern. In other words, the video block partitioning pattern 507 partitions the video coding block into two partitions, an upper horizontal fourth partition covering the upper horizontal fourth area of the video coding block and a lower three-fourth partition covering the lower horizontal three-fourth area of the video coding block.

The video block partitioning pattern 509 is adapted for horizontally partitioning the video coding block at one quarter of the height of the video coding block and is also referred to as 2N×nD video block partitioning pattern. In other words, the video block partitioning pattern 509 partitions the video coding block into two partitions, an upper horizontal three-fourth partition covering the upper horizontal three-fourth area of the video coding block and a lower fourth partition covering the lower horizontal fourth area of the video coding block.

The video block partitioning pattern 511 is adapted for vertically partitioning the video coding block at one quarter of the width of the video coding block and is also referred to as nL×2N video block partitioning pattern. In other words, the video block partitioning pattern 511 partitions the video coding block into two partitions, a vertical left fourth partition covering the vertical left side fourth area of the video coding block and a vertical right three-fourth partition covering the vertical right side three-fourth area of the video coding block.

The video block partitioning pattern 513 is adapted for vertically partitioning the video coding block at three quarters of the width of the video coding block and is also referred to as nR×2N video block partitioning pattern. In other words, the video block partitioning pattern 513 partitions the video coding block into two partitions, a vertical left three-fourth partition covering the vertical left side three-fourth area of the video coding block and a vertical right fourth partition covering the vertical right side fourth area of the video coding block.

FIG. 5 shows in addition a superposition of the conventional video block partitioning modes 503 to 513, shown in grey transparent and completely transparent, and an exemplary depth-based block partitioning, shown in black and white. The shown exemplary depth based block partitioning corresponds to the segmentation mask 409 of FIG. 4. The best matching video block partitioning mode, i.e. $i_{opt}$, is selected to represent the irregular shape video block partitioning of DBBP. DBBP can apply virtual partitioning as an approach for representing the irregular shape video block partitions as one of a group of rectangular video block partitioning patterns for prediction and data storage purposes.

In DBBP, a pixel-wise mask that can represent an arbitrary shape video block partitioning, i.e. a segmentation mask, can be mapped onto available regular, i.e. rectangular, video coding block patterns or partitions, e.g. the predetermined video coding block partitioning patterns 503 to 513 as shown in FIGS. 5 and 6, for storing of the coding information for the coded video coding block, including video coding block partitioning, to be easily referenced and/or used for prediction by latter encoded or decoded video coding blocks. According to DBBP, the mapping can be performed by down-sampling an original, i.e. pixel-wise, segmentation mask or partitioning mask onto a 2×2, 4×4, 8×8, 16×16, 32×32, 64×64, etc. sample or pixel grid or by representing the mask by the most similar regular video coding block partitioning mode for the current level in a block-tree used by the codec, i.e. using a so-called virtual partitioning.

Virtual partitioning may reduce the benefit of having irregular video coding block partitioning that can reflect borders of the objects in the visual scene. However, it makes the implementation of DBBP and its integration with codecs using regular partitioning patterns, like HEVC, less complex. In particular, determining the corners of virtual partitions to be used for selecting the neighboring reference video coding blocks can be a simple task and specific methods used by the codec can be applied. Consequently, the process of computing the virtual partitioning is an important part of a practical implementation of DBBP, e.g. in a 3D-HEVC codec.

An approach used in DBBP for acquiring a virtual partitioning, e.g. a mapping of a binary segmentation mask into one of the six available rectangular, non-square, video coding block partitioning modes, e.g. of HEVC, can comprise a correlation analysis.

For each of the video coding block partitioning modes $i \in [0,5]$, two binary masks $m_{2i}(x, y)$ and $m_{2i+i}(x, y)$ can be generated, wherein $m_{2i+i}(x, y)$ can be an inverse or negation of $m_{2i}(x, y)$. In order to find the best matching video coding block partitioning mode $i_{opt}$ for the current depth-based segmentation mask $m_D(x, y)$, the following algorithm can be performed:

$$k_{opt} = \underset{k}{\mathrm{argmax}} \sum_{x}^{2N-1} \sum_{y}^{2N-1} m_D(x, y) * m_k(x, y), k \in [0, 11]$$

$$i_{opt} = \left\lfloor \frac{k_{opt}}{2} \right\rfloor$$

$$b_{inv} = \begin{cases} 1, & \text{if } k_{opt} \text{ is odd} \\ 0, & \text{otherwise} \end{cases}$$

A Boolean variable $b_{inv}$ can define whether the derived segmentation mask $m_D(x, y)$ may be inverted or not. This might be desirable in some cases where the indexing of the conventional video coding block partitioning schemes can be complementary to the indexing in the segmentation mask. In the conventional video coding block partitioning modes, index 0 can define the video coding block partition in the top-left corner of the current video coding block, while the same index in the segmentation mask can define the segment with lower depth values, e.g. background objects. In order to align the positioning of the corresponding sets of motion information between $m_D(x, y)$ and $i_{opt}$, the indexing in $m_D(x, y)$ can be inverted, if $b_{inv}$ is set.

A number of approaches for determining a video coding block partitioning mode, e.g. alternative to a conventional rectangular one, can be applied. Also, simplifications to decide on the shape of the video coding block partitions of the video coding block partitioning mode, e.g. based on edge detection, can be applied. However, a mapping and/or approximation of an irregular shape to a conventional, e.g. rectangular, video coding block partitioning can be desirable.

In order to determine a virtual partitioning, the DBBP algorithm can apply a calculation of correlation coefficients of the irregular shape video coding block partitioning, e.g. using a binary segmentation mask, with masks representing each of the six rectangular video coding block partitioning schemes. The rectangular video coding block partitioning with the highest correlation coefficient can then be assigned. This process can be performed by scanning the segmentation mask values assigned to the samples within the block for calculation of the correlation coefficients. This process comprises two scanning passes of depth information values assigned to the samples within the block: a first scan to determine a threshold value to divide the video coding block into two partitions, i.e. the determination of a binary segmentation mask, a second scan to calculate the correlation coefficients.

In other words, such correlation based mappings of arbitrary shaped segmentations or partitionings to regular shaped partitioning patterns or modes is computationally complex.

Embodiments of the invention facilitate a less complex single-pass scanning of depth information values, i.e. decrease the complexity and time for rectangular video coding block partitioning derivation.

Specific embodiments of the invention relate to a method of determining the mapping of a binary segmentation mask to one of six available two-segment regular shape video coding block partitioning modes as for example shown in FIGS. 5 and 6, i.e. relate to virtual partitioning, which can be utilized by DBBP for video coding.

According to embodiments of the invention, the mapping of arbitrary segmentation masks to such virtual regular partitioning patterns can be performed by comparing binary values of selected samples in the binary segmentation mask and, based on the sample values, determining the virtual partitioning.

A number of variants of selecting the binary segmentation mask samples for the comparison can be applied. Further embodiments for determining the virtual partitioning according to selected segmentation mask samples are described below.

According to an embodiment for determining the rectangular shape video coding block partitioning, i.e. virtual partitioning, representing an irregular shape video coding block partitioning defined by a binary segmentation mask, a predefined decision rule that takes into account binary segmentation mask's values of preselected binary segmentation mask samples is applied. The binary segmentation mask defines the irregular video coding block partitioning used by a DBBP coding tool, in which the binary segmentation mask samples correspond to samples of the coded video coding block. The selection of the samples for deciding on the resultant rectangular shape video coding block partitioning, i.e. virtual partitioning, that represents the input irregular shape video coding block partitioning within the binary segmentation mask is performed according to a predefined selection pattern. A number of selection patterns can be applied.

Figure 7:
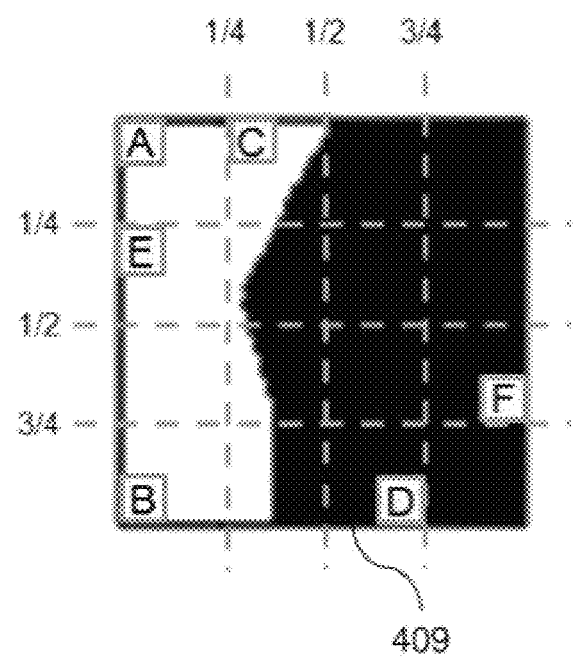
FIG. 7 shows a diagram of positions of samples within a segmentation mask according to an implementation form (6 point segmentation mask sample pattern)

FIG. 7 shows a diagram of positions of samples A, B, C, D, E, F within the exemplary segmentation mask 409 according to an embodiment. The diagram depicts the arrangement of the positions of 6 samples A, B, C, D, E, F and a grid (see hashed lines in FIG. 7) dividing the segmentation mask 409 at one quarter, one half, and three quarters of the height or width of the segmentation mask. Therefore, the diagram relates to a 6-point arrangement pattern with samples at corner and quarter mask or block positions.

The arrangement pattern comprises 2 corner samples placed on one of the mask or block borders, i.e. samples A and B, and 4 samples each at a different border of the mask or block, i.e. samples C, D, E and F, in particular 2 samples C and E positioned at ¼ mask or block with sample position N/4, wherein N is the number of samples on the single border of the mask or block (counted from left to right in the horizontal direction for C and counted top down in the vertical direction for E, according to the orientation of FIG. 7), and 2 samples D and F positioned at ¾ mask or block with sample position N·¾−1 (counted from left to right in the horizontal direction for D and counted top down in the vertical direction for F, according to the orientation of FIG. 7).

The position of the corner samples A and B can be modified i.e. placed on various borders of the mask or block. Similarly, the position of the border samples can be modified. In particular, samples C and D can be placed at ¼ of the top border and at ¾ of the bottom border of the block respectively, or at ¾ of the top border and at ¼ of the bottom border of the block respectively. Similarly, samples E and F can be placed at ¼ of the left border and at ¾ of the right border of the block respectively, or at ¾ of the left border and at ¼ of the right border of the block respectively.

Figure 8:
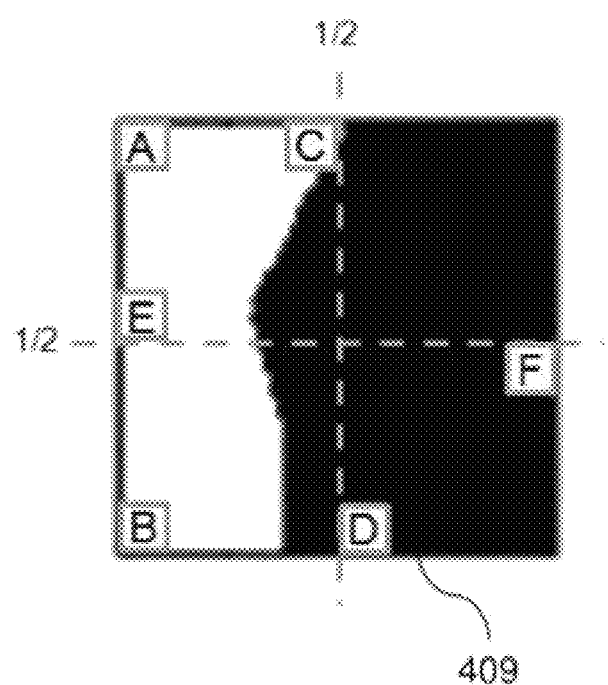
FIG. 8 shows a diagram of positions of samples within a segmentation mask according to an implementation form (another 6 point segmentation mask sample pattern)

FIG. 8 shows a diagram of positions of samples A, B, C, D, E, F within the exemplary segmentation mask 409 according to another embodiment. The diagram depicts the arrangement of the positions of the samples A, B, C, D, E, F and a grid (see hashed lines in FIG. 8) dividing the segmentation mask 409 at one half of the height and width of the segmentation mask. Therefore, the diagram relates to a 6-point arrangement pattern with samples at corners and half mask or block positions.

The arrangement pattern comprises 2 corner samples placed on one of the mask or block borders, i.e. samples A and B, and 4 samples each at a different border of the mask or block, i.e. samples C, D, E and F, in particular 2 samples positioned at N/2−1 (counted from left to right in the horizontal direction for C and counted top down in the vertical direction for E, according to the orientation of FIG. 8), wherein N is the number of samples on the single border of the mask or block, and 2 samples positioned at N/2 (counted from left to right in the horizontal direction for D and counted top down in the vertical direction for F, according to the orientation of FIG. 8).

The position of the corner samples A and B can be modified i.e. placed on various borders of the mask or block. Similarly, the position of the border samples can be modified. In particular, samples C and D can be placed at sample position N/2−1 (counted from left to right in the horizontal direction) of the top border (as shown in FIG. 8) and sample position N/2 (also counted from left to right in the horizontal direction) of the bottom border of the block respectively (as shown in FIG. 8), or at sample position N/2 of the top border and at sample position N/2−1 of the bottom border of the block respectively. Similarly, samples E and F can be placed at sample position N/2−1 (counted top down in the vertical direction) of the left border (as shown in FIG. 8) and at sample position N/2 (counted top down in the vertical direction) of the right border of the block respectively (as shown in FIG. 8), or at sample position N/2 of the left border and at sample position N/2−1 of the right border of the block respectively.

Additionally, in case of 6-point arrangement patterns, other positions which may not be located at ¼, ½ and ¾ mask or block positions of the border samples can be chosen. The positions of the border samples from the opposite borders of the mask or block can be symmetric with regard to the center of the mask or block.

Figure 9A:
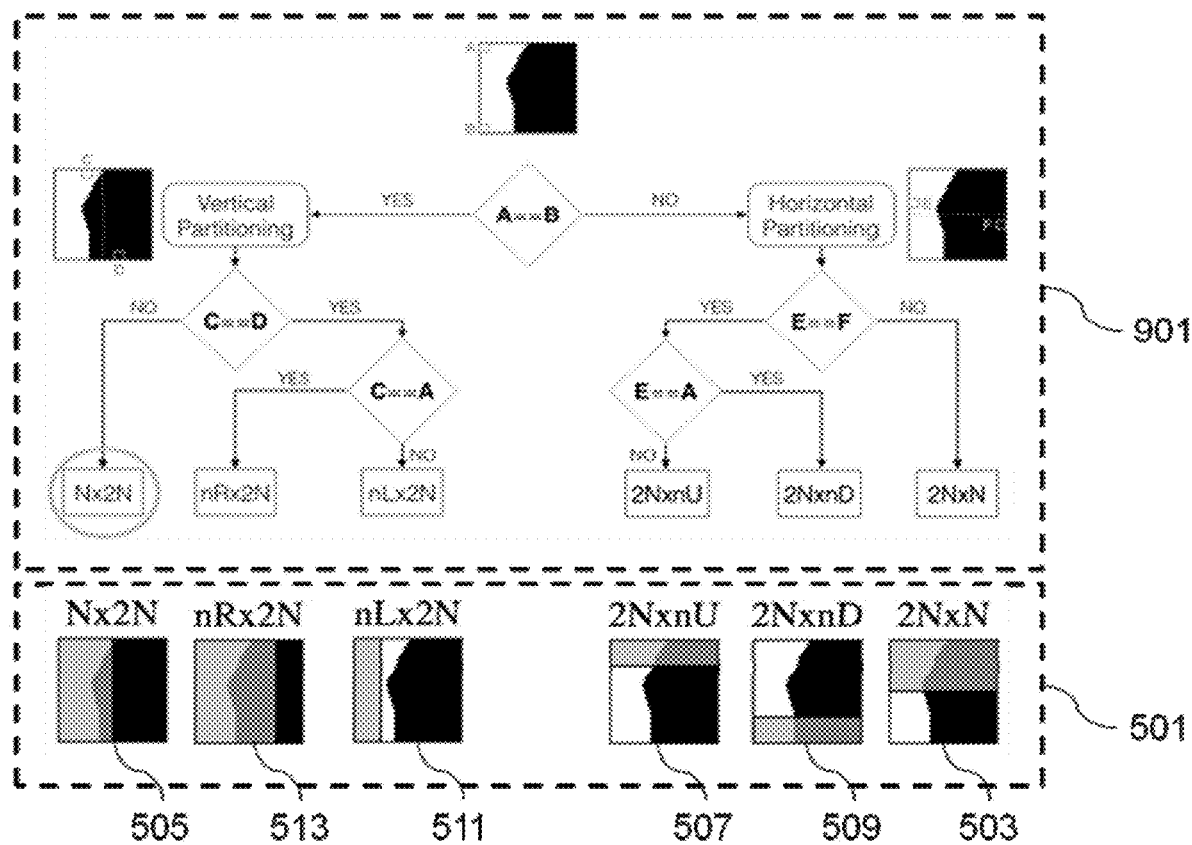
FIG. 9A shows a diagram of a decision tree for selecting a video block partitioning pattern from a predetermined group of video block partitioning patterns according to an implementation form.
Figure 9B:
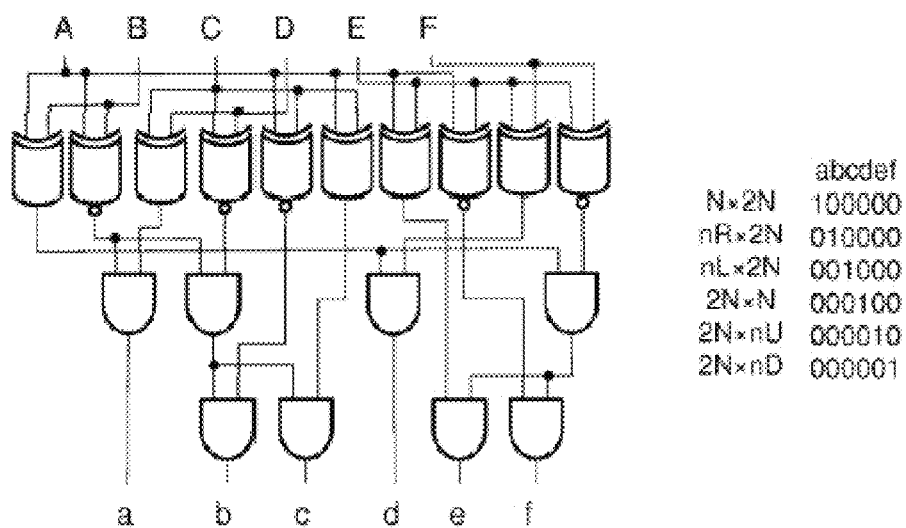
FIG. 9B shows a circuit diagram of a logical gate structure for selecting a video block partitioning pattern from a predetermined group of video block partitioning patterns according to an implementation form.
Figure 9C:
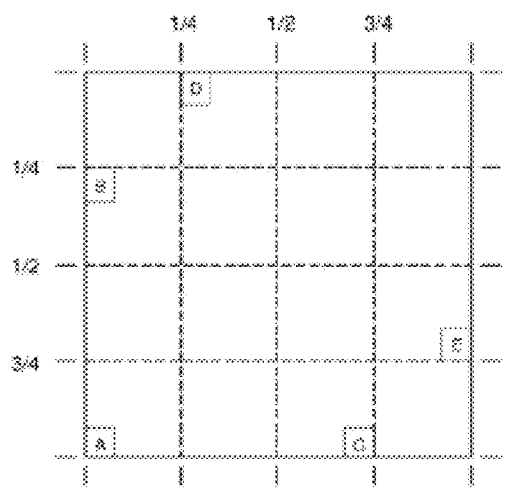
FIG. 9C shows a diagram of positions of samples within a segmentation mask according to an implementation form (5 point segmentation mask sample pattern)
Figure 9D:
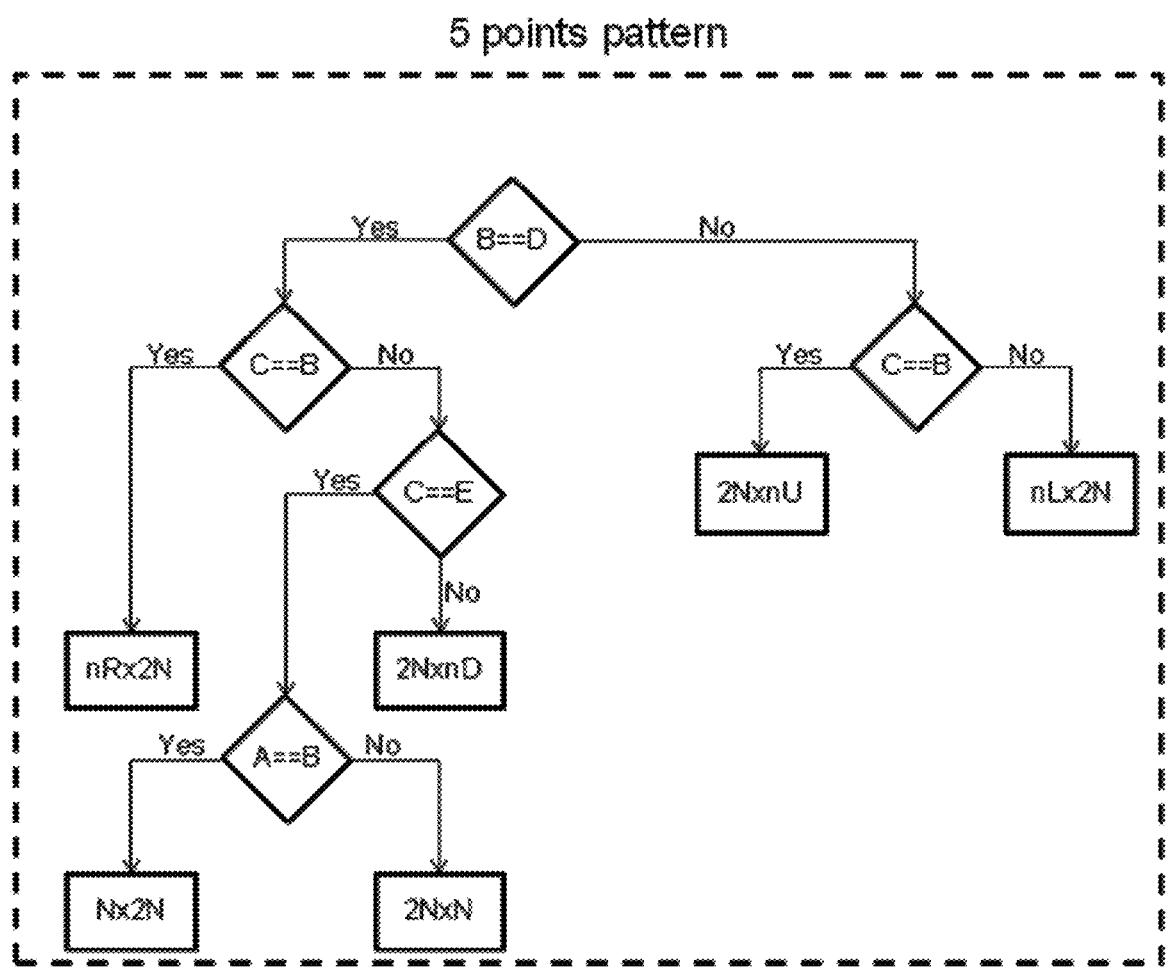
FIG. 9D shows a diagram of a decision tree for selecting a video block partitioning pattern from a predetermined group of video block partitioning patterns according to an implementation form (5 point segmentation mask sample pattern of FIG. 9C)
Figure 9E:
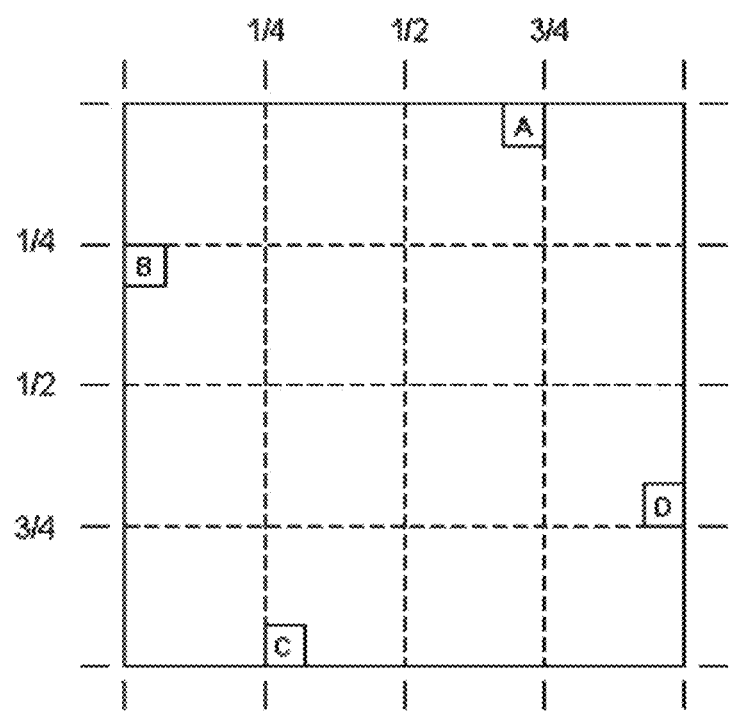
FIG. 9E shows a diagram of positions of samples within a segmentation mask according to an implementation form (4 point segmentation mask sample pattern)
Figure 9F:
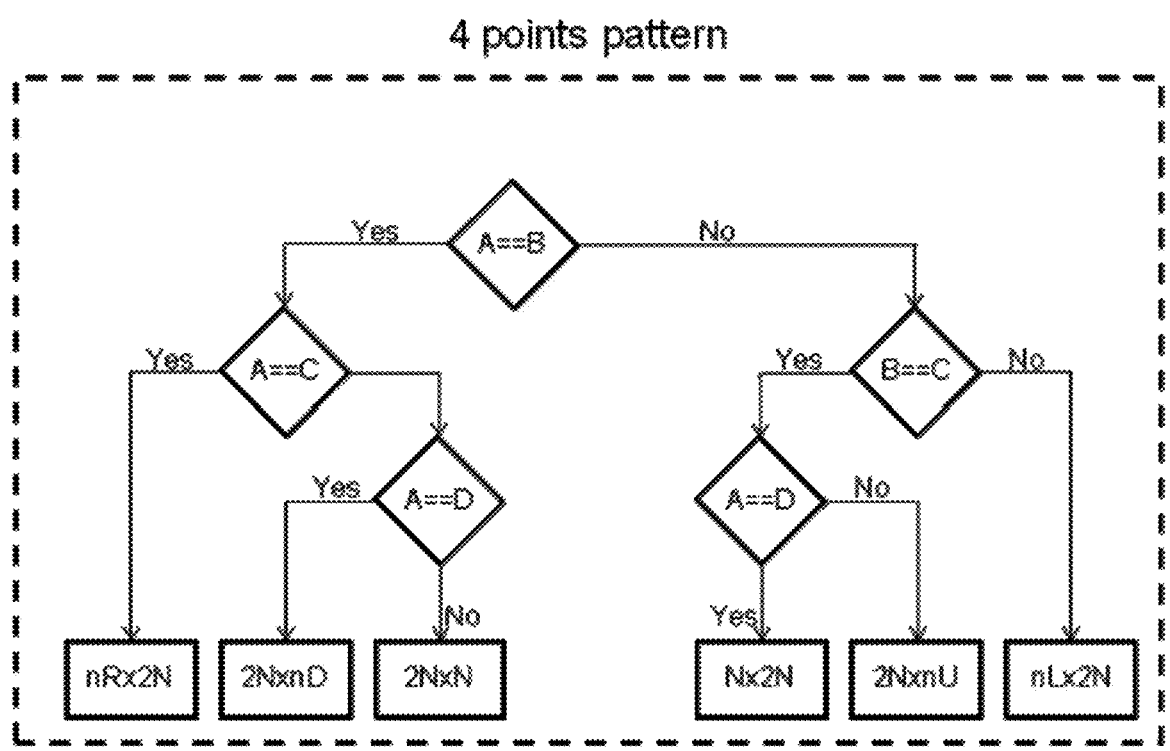
FIG. 9F shows a diagram of a decision tree for selecting a video block partitioning pattern from a predetermined group of video block partitioning patterns according to an implementation form (4 point segmentation mask sample pattern of FIG. 9E)
Figure 9G:
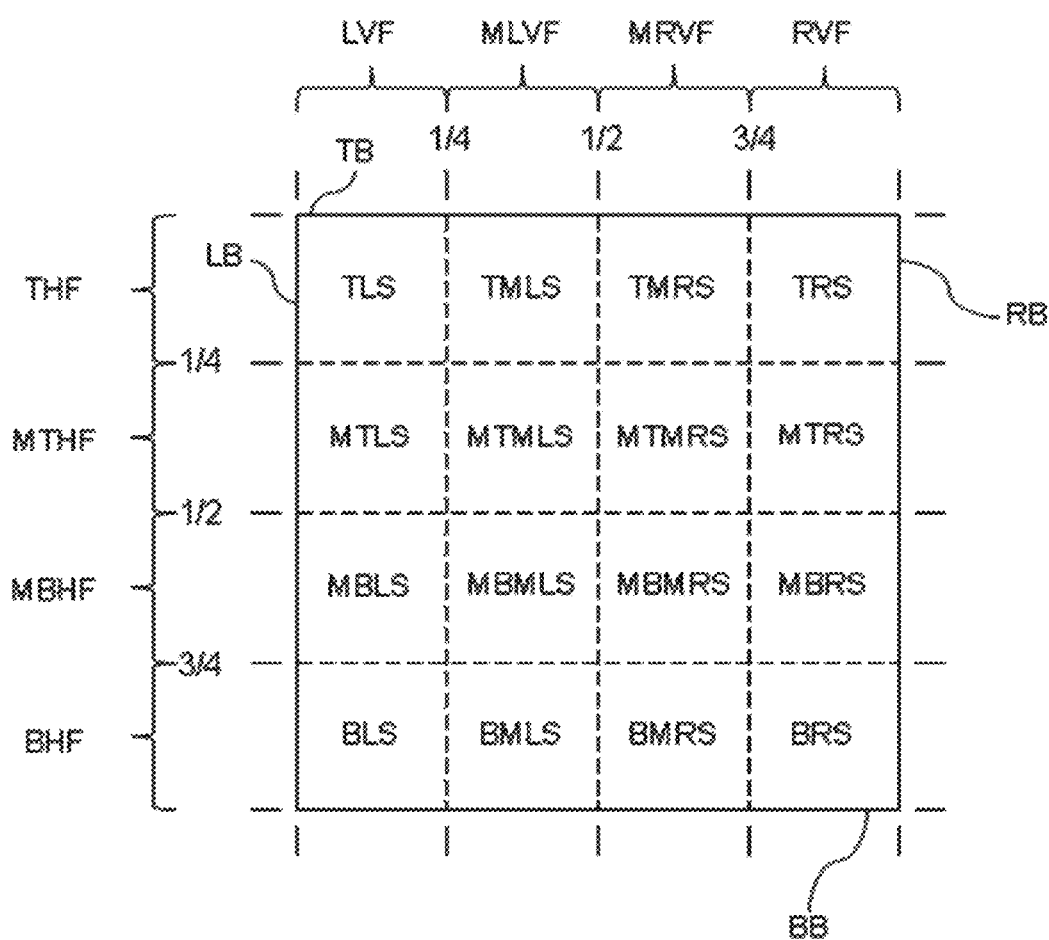
FIG. 9G shows a diagram of a video coding block and a grid dividing the video coding block into half, fourth and sixteenth parts of the video coding block.

FIG. 9G shows a video coding block with a grid dividing the block into halves (areas covering each a rectangular half of the overall area of the video coding block), fourths (areas covering each a rectangular fourth of the overall area of the video coding block) and sixteenths (areas covering each a rectangular sixteenth of the overall area of the video coding block).

Reference sign LB refers to the left border (LB) of the video coding block, reference sign RB refers to the right border (RB) of the video coding block, reference sign TB refers to the top border (TB) of the video coding block, and reference sign BB refers to the bottom border (BB) of the video coding block.

Reference sign THF refers to the top horizontal fourth (THF) of the video coding block area, reference sign MTHF refers to the mid top horizontal fourth (MTHF) of the video coding block area, reference sign MBHF refers to the mod bottom horizontal fourth (MBHF) of the video coding block area, and reference sign BHF refers to the bottom horizontal fourth (BHF) of the video coding block area.

Reference sign LVF refers to the left vertical fourth (LVF) of the video coding block area, reference sign MLVF refers to the mid left vertical fourth (MLVF) of the video coding block area, reference sign MRVF refers to the mid right vertical fourth (MRVF) of the video coding block area, and reference sign RVF refers to the right vertical fourth (RVF) of the video coding block area.

Reference sign TLS refers to the top left sixteenth (TLS) of the video coding block area, reference sign TMLS refers to the top mid left sixteenth (TMLS) of the video coding block area, reference sign TMRS refers to the top mid right sixteenth (TMRS) of the video coding block area, reference sign TRS refers to the top right sixteenth (TRS) of the video coding block area, reference sign MTLS refers to the mid top left sixteenth (MTLS) of the video coding block area, reference sign MTMLS refers to the mid top mid left sixteenth (MTMLS) of the video coding block area, reference sign MTMRS refers to the mid top mid right sixteenth (MTMRS) of the video coding block area, reference sign MTRS refers to the mid top right sixteenth (MTRS) of the video coding block area, reference sign MBLS refers to the mid bottom left sixteenth (MBLS) of the video coding block area, reference sign MBMLS refers to the mid bottom mid left sixteenth (MBMLS) of the video coding block area, reference sign MBMRS refers to the mid bottom mid right sixteenth (MBMRS) of the video coding block area, reference sign MBRS refers to the mid bottom right sixteenth (MBRS) of the video coding block area, reference sign BLS refers to the bottom left sixteenth (BLS) of the video coding block area, reference sign BMLS refers to the bottom mid left sixteenth (BMLS) of the video coding block area, reference sign BMRS refers to the bottom mid right sixteenth (BMRS) of the video coding block area, and reference sign BRS refers to the bottom right sixteenth (MBRS) of the video coding block area.

Referring back to the 6 point spatial segmentation mask patterns described based on FIGS. 7 and 8, the positions of the six segmentation mask samples A to F is not limited to the 6 specific positions as shown in FIGS. 7 and 8. In further embodiments, for example, sample A may represent any position within the area TLS (or TRS, BLS or BRS), sample B may correspondingly represent any position within area BLS (or any of TRS, BLS or BRS which shares a same border with A), sample C may represent any position within area TMLS, sample D may represent any position within area BMRS, sample E may represent any position within area MTLS, and sample F may represent any position within area MBRS.

The determining of the regular shape video coding block partitioning, i.e. virtual partitioning, representing a binary segmentation mask can be performed based on a predefined decision rule that can use the values of the selected binary segmentation mask samples. Different decision rules can be applied.

FIG. 9 shows a diagram of a decision tree 901 according to an embodiment for selecting a video block partitioning pattern 503, 505, 507, 509, 511, 513 from the predetermined group 501 of video block partitioning patterns 503, 505, 507, 509, 511, 513 as described based on FIGS. 5 and 6. The diagram relates to a decision rule for a 6-point arrangement pattern in form of a decision tree 901 and additionally shows the result (N×2N in a circle) of the selection for the exemplary segmentation mask 409.

Referring to FIG. 9, the selection of the predetermined video coding block partition is performed according to the following steps.

Firstly, decide on the vertical or horizontal video coding block partitioning based on a comparison of the values of the corner samples A and B. As the samples A and B are placed on a vertical border of the mask or block, here at the left top and left bottom corners as shown in FIGS. 7 to 9, select one of the available vertical video block partitioning patterns 505, 511 and 513, if the value of sample A is equal to the value of sample B, otherwise select from the group of horizontal video block partitioning patterns 503, 507, 509.

Secondly, decide on the specific video coding block partitioning from the horizontal or vertical group selected in the previous step.

If a vertical video block partitioning pattern was selected, decide based on a comparison of the top and bottom border samples C and D. If the value of sample C is not equal to the value of sample D, select the N×2N video block partitioning pattern; otherwise compare one of the border samples C or D (which in this case have the same value) with one of the corner samples A or B (which in this case also have the same value). If the value of sample C (or D) is equal to the value of sample A (or B) select the nR×2N video block partitioning pattern, otherwise select the nL×2N video block partitioning pattern.

If a horizontal video block partitioning pattern was selected, decide based on a comparison of the left and right border samples E and F. If the value of sample E is not equal to the value of sample F, select the 2N×N video block partitioning pattern; otherwise compare one of the border samples E or F, which in this case have the same value, with one of the corner samples A or B (which in this case according to the decision tree as depicted in FIG. 9 do not have the same value). If the value of sample E (or F) is equal to the value of sample A select the 2N×nU video block partitioning pattern, otherwise select the 2N×nD video block partitioning pattern (as shown in FIG. 9). If the value of sample E (or F) is not equal to the value of sample B select the 2N×nU video block partitioning pattern, otherwise select the 2N×nD video block partitioning pattern (not shown in FIG. 9).

In an alternative embodiment, the corner samples A and B are positioned at or relate to corner positions at the right border, e.g. A at the right top corner and B at the right bottom corner. The first comparison step (A==B) is the same as described above (distinction of vertical and horizontal video block partitioning pattern) and also the consecutive steps (e.g. the steps for the horizontal partitioning selection at the right side of the decision tree and the second comparison step (C==D) at the left side of the decision tree) remain the same except for the third comparison step at the left side of the decision tree. Due to the different border the segmentation mask samples A and B now relate to (now right border instead of left border), the third comparison step at the left side of the decision tree is inverse. I.e. the decision comprises if the value of sample C is equal to the value of sample D, compare one of the border samples C or D (which in this case have the same value) with one of the corner samples A or B (which in this case also have the same value). If the value of sample C (or D) is equal to the value of sample A (or B) select the nL×2N video block partitioning pattern, otherwise select the nR×2N video block partitioning pattern.

In further embodiments the samples A and B are placed on a horizontal border of the block, e.g. at the top left and top right corners or at the bottom left and bottom right corners. In such embodiments, the process of selecting a video coding block partition is performed according to the following steps.

Firstly, decide on the vertical or horizontal video coding block partitioning based on a comparison of the values of the corner samples A and B. As the samples A and B are placed on a horizontal border of the mask or block, here at the left top and right top corners, select one of the available vertical video block partitioning patterns 505, 511 and 513, if the value of sample A is not equal to the value of sample B, otherwise select from the group of horizontal video block partitioning patterns 503, 507, 509.

Secondly, decide on the specific video coding block partitioning from the horizontal or vertical group selected in the previous step.

If a vertical video block partitioning pattern was selected, decide based on a comparison of the top and bottom border samples C and D. If the value of sample C is not equal to the value of sample D, select the N×2N video block partitioning pattern; otherwise compare one of the border samples C or D (which in this case have the same value) with one of the corner samples A or B (which in this case do not have the same value). If the value of sample C (or D) is equal to the value of sample A select the nR×2N video block partitioning pattern, otherwise select the nL×2N video block partitioning pattern. If the value of sample C (or D) is not equal to the value of sample B select the nR×2N video block partitioning pattern, otherwise select the nL×2N video block partitioning pattern.

If a horizontal video block partitioning pattern was selected, decide based on a comparison of the left and right border samples E and F. If the value of sample E is not equal to the value of sample F, select the 2N×N video block partitioning pattern; otherwise compare one of the border samples E or F (which in this case have the same value) with one of the corner samples A or B (which in this case have the same value). If the value of sample E (or F) is not equal to the value of sample A (or B) select the 2N×nU video block partitioning pattern, otherwise select the 2N×nD video block partitioning pattern.

In a further embodiment, in which the corner segmentation mask samples relate to the left bottom and right bottom corners, the selection process is as follows.

Firstly select one of the available vertical video block partitioning patterns 505, 511 and 513, if the value of sample A is not equal to the value of sample B, otherwise select from the group of horizontal video block partitioning patterns 503, 507, 509.

Secondly, decide on the specific video coding block partitioning from the horizontal or vertical group selected in the previous step.

If a vertical video block partitioning pattern was selected, decide based on a comparison of the top and bottom border samples C and D. If the value of sample C is not equal to the value of sample D, select the N×2N video block partitioning pattern; otherwise compare one of the border samples C or D (which in this case have the same value) with one of the corner samples A or B (which in this case do not have the same value). If the value of sample C (or D) is equal to the value of sample A select the nR×2N video block partitioning pattern, otherwise select the nL×2N video block partitioning pattern. Accordingly, if the value of sample C (or D) is not equal to the value of sample B select the nR×2N video block partitioning pattern, otherwise select the nL×2N video block partitioning pattern.

If a horizontal video block partitioning pattern was selected, decide based on a comparison of the left and right border samples E and F. If the value of sample E is not equal to the value of sample F, select the 2N×N video block partitioning pattern; otherwise compare one of the border samples E or F (which in this case have the same value) with one of the corner samples A or B (which in this case have the same value). If the value of sample E (or F) is equal to the value of sample A (or B) select the 2N×nU video block partitioning pattern, otherwise select the 2N×nD video block partitioning pattern.

Embodiments of the decision tree or selection algorithm as described based on FIG. 9 provides a selection result after only 2 and maximum 3 pair wise comparisons of segmentation sample values. Depending on the result of the first pair wise comparison of the corner segmentation mask samples A and B, only one additional pair of samples values has to be obtained and compared, either C and D (for a further vertical differentiation to select one of the non-half vertical partitioning patterns) or E and F (for a further horizontal differentiation to select one of the non-half horizontal partitioning patterns). Thus only 4 segmentation sample values have to be obtained to select the best matching rectangular partitioning pattern of the group 501 of predetermined partitioning patterns in 2 or 3 comparison steps.

Although FIG. 9 shows the spatial segmentation mask sample pattern A to F as described based on FIG. 7, the same decision tree can also be used for alternative embodiments using the spatial segmentation mask sample pattern A to F as described based on FIG. 8.

In addition to 6-point arrangement patterns, a number of extensions to more than 6 points can be applied to both arrangement patterns and decision rules. Although such arrangement patterns can comprise redundant points, the accuracy and robustness of the decision process can be improved.

In particular, in order to decrease the complexity of the decision process, the abovementioned decision rules can be implemented in form of a decision tree, comprising a combination of IF/ELSE statements taking the values of the selected samples as an input, in form of logical gates, comprising a combination of AND/OR statements taking the values of the selected samples as an input, or in form of a lookup table, comprising mapping all possible combinations of the values of the selected samples to a matched video block partitioning pattern.

Below an embodiment of a lookup table for a segmentation mask sample pattern for selecting one of the group of six video coding block partitions 503 to 513 is shown (the look-up table corresponds to the decision tree as depicted in FIG. 9):

| Address | | | | | | Value |
|---|---|---|---|---|---|---|
| A | B | C | D | E | F | |
| 0 | 0 | 0 | 0 | 0 | 0 | nRx2N |
| 0 | 0 | 0 | 0 | 0 | 1 | nRx2N |
| 0 | 0 | 0 | 0 | 1 | 0 | nRx2N |
| 0 | 0 | 0 | 0 | 1 | 1 | nRx2N |
| 0 | 0 | 0 | 1 | 0 | 0 | Nx2N |
| 0 | 0 | 0 | 1 | 0 | 1 | Nx2N |
| 0 | 0 | 0 | 1 | 1 | 0 | Nx2N |
| 0 | 0 | 0 | 1 | 1 | 1 | Nx2N |
| 0 | 0 | 1 | 0 | 0 | 0 | Nx2N |
| 0 | 0 | 1 | 0 | 0 | 1 | Nx2N |
| 0 | 0 | 1 | 0 | 1 | 0 | Nx2N |
| 0 | 0 | 1 | 0 | 1 | 1 | Nx2N |
| 0 | 0 | 1 | 1 | 0 | 0 | nLx2N |
| 0 | 0 | 1 | 1 | 0 | 1 | nLx2N |
| 0 | 0 | 1 | 1 | 1 | 0 | nLx2N |
| 0 | 0 | 1 | 1 | 1 | 1 | nLx2N |
| 0 | 1 | 0 | 0 | 0 | 0 | 2NxnD |
| 0 | 1 | 0 | 0 | 0 | 1 | 2NxN |
| 0 | 1 | 0 | 0 | 1 | 0 | 2NxN |
| 0 | 1 | 0 | 0 | 1 | 1 | 2NxnU |
| 0 | 1 | 0 | 1 | 0 | 0 | 2NxnD |
| 0 | 1 | 0 | 1 | 0 | 1 | 2NxN |
| 0 | 1 | 0 | 1 | 1 | 0 | 2NxN |
| 0 | 1 | 0 | 1 | 1 | 1 | 2NxnU |
| 0 | 1 | 1 | 0 | 0 | 0 | 2NxnD |
| 0 | 1 | 1 | 0 | 0 | 1 | 2NxN |
| 0 | 1 | 1 | 0 | 1 | 0 | 2NxN |
| 0 | 1 | 1 | 0 | 1 | 1 | 2NxnU |
| 0 | 1 | 1 | 1 | 0 | 0 | 2NxnD |
| 0 | 1 | 1 | 1 | 0 | 1 | 2NxN |
| 0 | 1 | 1 | 1 | 1 | 0 | 2NxN |
| 0 | 1 | 1 | 1 | 1 | 1 | 2NxnU |
| 1 | 0 | 0 | 0 | 0 | 0 | 2NxnU |
| 1 | 0 | 0 | 0 | 0 | 1 | 2NxN |
| 1 | 0 | 0 | 0 | 1 | 0 | 2NxN |
| 1 | 0 | 0 | 0 | 1 | 1 | 2NxnD |
| 1 | 0 | 0 | 1 | 0 | 0 | 2NxnU |
| 1 | 0 | 0 | 1 | 0 | 1 | 2NxN |
| 1 | 0 | 0 | 1 | 1 | 0 | 2NxN |
| 1 | 0 | 0 | 1 | 1 | 1 | 2NxnD |
| 1 | 0 | 1 | 0 | 0 | 0 | 2NxnU |
| 1 | 0 | 1 | 0 | 0 | 1 | 2NxN |
| 1 | 0 | 1 | 0 | 1 | 0 | 2NxN |
| 1 | 0 | 1 | 0 | 1 | 1 | 2NxnD |
| 1 | 0 | 1 | 1 | 0 | 0 | 2NxnU |
| 1 | 0 | 1 | 1 | 0 | 1 | 2NxN |
| 1 | 0 | 1 | 1 | 1 | 0 | 2NxN |
| 1 | 0 | 1 | 1 | 1 | 1 | 2NxnD |
| 1 | 1 | 0 | 0 | 0 | 0 | nLx2N |
| 1 | 1 | 0 | 0 | 0 | 1 | nLx2N |
| 1 | 1 | 0 | 0 | 1 | 0 | nLx2N |
| 1 | 1 | 0 | 0 | 1 | 1 | nLx2N |
| 1 | 1 | 0 | 1 | 0 | 0 | Nx2N |
| 1 | 1 | 0 | 1 | 0 | 1 | Nx2N |
| 1 | 1 | 0 | 1 | 1 | 0 | Nx2N |
| 1 | 1 | 0 | 1 | 1 | 1 | Nx2N |
| 1 | 1 | 1 | 0 | 0 | 0 | Nx2N |
| 1 | 1 | 1 | 0 | 0 | 1 | Nx2N |
| 1 | 1 | 1 | 0 | 1 | 0 | Nx2N |
| 1 | 1 | 1 | 0 | 1 | 1 | Nx2N |
| 1 | 1 | 1 | 1 | 0 | 0 | nRx2N |
| 1 | 1 | 1 | 1 | 0 | 1 | nRx2N |
| 1 | 1 | 1 | 1 | 1 | 0 | nRx2N |
| 1 | 1 | 1 | 1 | 1 | 1 | nRx2N |

According to an embodiment of an apparatus 200 for associating a video block partitioning pattern, e.g. 503, 505, 507, 509, 511, 513, to a video coding block 301 comprises an obtainer 201, a selector 203 and an associator 205.

The obtainer 201 is adapted to obtain values of a set of segmentation mask samples, e.g. 6 values of the set of segmentation mask samples A, B, C, D, E, F, wherein each segmentation sample of the set of segmentation mask samples represents a different position in a segmentation mask 409 adapted to define video coding block partitions of the video coding block.

The selector 203 is adapted to select a video block partitioning pattern, e.g. 503, 505, 507, 509, 511, 513, from a predetermined group, e.g. 501, of video block partitioning patterns, e.g. 503, 505, 507, 509, 511, 513, based on the values of segmentation mask samples of the set of segmentation mask samples and a look-up table, wherein the look-up table maps combinations of the values to one of the video coding block partitions of the group of video coding block partitions, e.g. to one of the 6 video coding block partitions 503 to 513 as shown in the above table.

The associator 205 is adapted to associate the selected video block partitioning pattern (503, 505, 507, 509, 511, 513) to the video coding block (301).

In FIG. 9B an embodiment of a gate array or gate structure for selecting one of the group of six video coding block partitions 503 to 513 based on the segmentation mask sample pattern of FIGS. 7 and 8 is shown (the gate structure corresponds to the decision tree as depicted in FIG. 9).

The gate structure comprises 6 input ports A to F which correspond to the 6 segmentation mask samples A to F, and are adapted to obtain the values of the 6 segmentation mask samples A to F. The gate structure comprises AND-gates, X-OR gates and X-NOR gates connected as shown in FIG. 9B. The gate structure comprises 6 output ports a to f, which values or bits {a, b, c, d, e, f} form a binary code indicating the corresponding selection result, i.e. one of the 6 video coding partitioning patterns 503 to 513.

Alternative embodiments may use more or less segmentation mask samples to select the 6 video coding partitioning patterns 503 to 513 or other video coding partitioning patterns of other groups with 6 or more or less video coding partitioning patterns than 6.

In a further embodiment, e.g. only 5 segmentation mask samples are used to select the 6 video coding partitioning patterns 503 to 513.

FIG. 9C shows an exemplary spatial segmentation mask sample pattern for selecting the 6 video coding partitioning patterns 503 to 513 based on only 5 segmentation mask samples A to E. FIG. 9D shows an embodiment of a corresponding decision tree or decision algorithm for the exemplary spatial segmentation mask sample pattern of FIG. 9C.

As described above, in embodiments using the 6-point pattern the number of memory accesses is always 4, while in the above 5-point scheme the minimum number of memory accesses is 3, however, in the worst case it is 5. Furthermore, the number of comparisons for the 6-point pattern is 2 to 3, while in the case of the 5-point pattern the number is 2 to 4.

Beyond that, the additional point in the 6-point pattern compared to the 5 point pattern may increase the accuracy of video block partitioning selection.

Compared to the 6 point spatial segmentation mask sample patterns as described based on FIG. 7, the position of sample A in FIG. 9C relates to the position of sample B in FIG. 7, the position of sample B in FIG. 9C relates to the position of sample E in FIG. 7, the position of sample C in FIG. 9C relates to the position of sample D in FIG. 7, the position of sample D in FIG. 9C relates to the position of sample C in FIG. 7, and the position of sample E in FIG. 9C relates to the position of sample F in FIG. 7.

In further embodiments of 5 point spatial segmentation mask sample patterns the segmentation mask sample may relate to the left top corner, the right top corner or the right bottom corner position.

As already described based on FIGS. 7 and 8, the position of the five segmentation mask samples is not limited to the 5 specific positions as shown in FIG. 9 C. in further embodiments, for example, sample A may represent any position within the area BLS, TLS, TRS or BRS, sample B may represent any position within area MTLS, sample C may represent any position within area BMRS, sample D may represent any position within area TMLS, and sample E may represent any position within area MBRS.

Concerning the decision trees for these alternative embodiments the same as for the alternative decision trees described based on FIG. 9A applies.

In further embodiments, e.g. only 4 segmentation mask samples are used to select the 6 video coding partitioning patterns 503 to 513.

FIG. 9E shows an exemplary 4 point spatial segmentation mask sample pattern for selecting the 6 video coding partitioning patterns 503 to 513 based on only 4 segmentation mask samples A to D. FIG. 9F shows an embodiment of a corresponding decision tree or decision algorithm for the exemplary spatial segmentation mask sample pattern of FIG. 9E.

The number of memory access operations is 3 to 4 for the above 4-point pattern and always 4 for the 6-point patterns as described above. The number of comparisons for both 4-point and 6-point pattern is 2 to 3. However, the additional 2 points in the 6-point patterns may increase the accuracy of video block partitioning selection.

As already described based on FIGS. 7 and 8, the position of the four segmentation mask samples is not limited to the four specific positions as shown in FIG. 9 E. In further embodiments, for example, sample A may represent any position within the area TMRS, sample B may represent any position within area MTLS, sample C may represent any position within area MBLS, and sample D may represent any position within area MBRS. In even further embodiments, for example, sample A may represent any position within the area TMLS, sample B may represent any position within area MBLS, sample C may represent any position within area BMRS, and sample D may represent any position within area MTRS.

Concerning the decision trees for these alternative embodiments the same as for the alternative decision trees described based on FIG. 9A applies.

Concerning the sample positions the segmentation mask samples may refer to, besides the characteristic to allow a reliable selection of the predetermined video coding partitioning patterns, the complexity of the address computation for accessing the values of the segmentation mask samples has a large influence on the efficiency of the selection process, in particular due to large number of selections that have to be performed for coding a video sequence.

Using locations of the segmentation mask samples that are either corner samples or samples located at sample positions N/4, N/2, N−1−N/2 (N/2−1), ¾N or N−1−N/4 (¾N−1) keep the complexity of calculating the addresses of the samples in the block to be accessed minimal. To compute these addresses only right bit-shifts by one or two positions or/and decrementation (subtracting by 1) operations need to be applied. This decreases the computational complexity that has to be spent to access the segmentation mask samples stored in a memory.

The performance of the binary segmentation mask sample arrangement and the decision rules were tested using common test conditions (CTC) of the JCT-3V standardization group. The methods provide an excellent coding performance with low computational complexity.

The sample arrangement and decision rule can be pre-selected, adaptively selected, or signaled explicitly. In case of a pre-selection or an adaptive arrangement by the encoder, no additional information may be signaled to the decoder. If the encoder uses explicit signaling of the selected sample arrangement patterns and decision rules, this information can be signaled to the decoder. This information can be switchable per sequence, per GOP (Group of Pictures), per intra-period, per picture, per slice, per coding unit and/or per partition.

The sample arrangement can be applied using both a pixel-wise segmentation or partitioning mask, e.g. a pixel-wise segmentation mask of DBBP, or its down-sampled version, i.e. a 2×2, a 4×4, an 8×8, a 16×16, a 32×32, a 64×64, etc. sample or pixel grid, e.g. a part-wise segmentation mask of DBBP, wherein a part can refer to a 4×4 sample or pixel unit.

A plurality of advantages can be achieved. The method can provide a fast and low-complexity approach for determining a rectangular shape video coding block partitioning, i.e. virtual partitioning, to represent the irregular shape video coding block partitions e.g. in DBBP. No full scanning pass of the binary segmentation mask values needs to be applied. According to the selected decision rule only up to 4 binary segmentation mask sample values may be accessed. The method can easily be adapted to coding algorithms, e.g. for the 3D-HEVC or 3D-AVC standard. In particular, the method of determining the rectangular video coding block partitioning representing the binary segmentation mask can be used for coding in AVC or HEVC video codecs and their multi-view or 3D variants.

Figure 10:
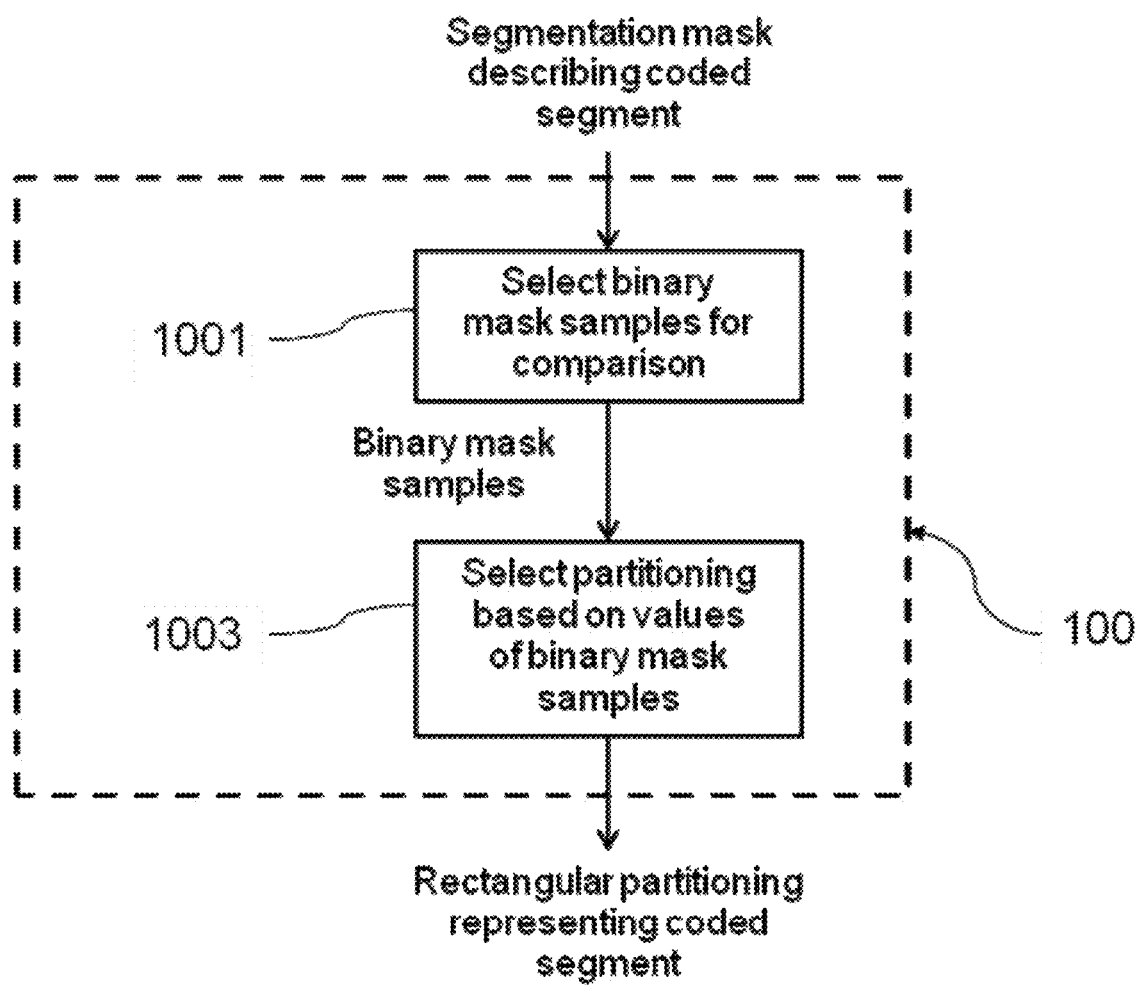
FIG. 10 shows a diagram of a method for associating a video block partitioning pattern to a video coding block according to an implementation form.

FIG. 10 shows a diagram of a method 100 for associating a video block partitioning pattern to a video coding block according to an embodiment. The diagram relates to a block diagram for determining a rectangular video coding block partitioning representing a binary segmentation mask.

The method 100 can be adapted to determine a rectangular video coding block partitioning representing a binary segmentation mask. A segmentation mask describing a coded video coding block or segment can be provided to step 1001. In step 1001, samples of the segmentation mask can be selected for comparison. In step 1003, a rectangular video coding block partitioning representing the binary segmentation mask can be selected or determined based on the values of the selected binary segmentation mask samples, i.e. the output of step 1001. The step 1003 can provide a rectangular video coding block partitioning representing a coded video coding block or segment.

Embodiments of the invention relate to a method and a video coder for sample-based partitioning derivation based on depth information.

Embodiments of the invention can relate to a method for determining a regular shape video coding block partitioning of a coded video coding block based on a binary segmentation mask, comprising selecting samples of the binary segmentation mask according to a predetermined arrangement pattern, and mapping the irregular shape video coding block partitioning of the binary segmentation mask to a regular shape video coding block partitioning based on the values of the selected samples using a predetermined decision scheme. The method can be used both for coding and decoding video signals. The binary segmentation mask can be generated based on the depth information.

A method for selecting sample arrangement patterns, e.g. sample arrangement patterns comprising 6-points and more or less than 6 points, can be applied. Furthermore, a method for determining the regular shape video coding block partitioning based on the samples in form of decision rules can be applied. Moreover, a method for signaling sample arrangement patterns and decision rules to a decoder can be applied. Moreover, different decision rules can be implemented.

Embodiments of the invention can relate to a method for deriving a video coding block partitioning based on corresponding values of depth information samples. The method can provide a fast and low-complexity single-scan algorithm for deriving a video coding block partitioning based on depth information assigned to samples of the video coding block.

What is claimed is:

1. An apparatus for associating a video block partitioning pattern to a video coding block based on samples of a segmentation mask, the apparatus comprising a processor to execute computer executable instructions stored on a non-transient computer readable medium, so that when the instructions are executed, the processor is adapted to:
 obtain values of four to six samples from a larger set of samples of the segmentation mask for the video coding block,
  wherein each of the four to six samples represents a different position in the segmentation mask, and
  wherein the segmentation mask is adapted to define video coding block partitions of the video coding block and at least one of the video coding block partitions have one or more non-rectangular shapes;
 select the video block partitioning pattern from a group of video block partitioning patterns based on a decision rule that only uses values of the four to six samples; and
 associate the selected video block partitioning pattern to the video coding block, wherein patterns in the group of video block partitioning patterns have rectangular shapes.

2. The apparatus according to claim 1, wherein the decision rule comprises a comparison and selecting the video block partitioning pattern comprises comparing the values of the four to six samples.

3. The apparatus according to claim 1, wherein the group of video block partitioning patterns comprises at least one video block partitioning pattern selected from the group comprising:
 a video block partitioning pattern for horizontally partitioning the video coding block at one quarter of the height of the video coding block,
 a video block partitioning pattern for horizontally partitioning the video coding block at one half of the height of the video coding block,
 a video block partitioning pattern for horizontally partitioning the video coding block at three quarters of the height of the video coding block,
 a video block partitioning pattern for vertically partitioning the video coding block at one quarter of the width of the video coding block,
 a video block partitioning pattern for vertically partitioning the video coding block at one half of the width of the video coding block, and a video block partitioning pattern for vertically partitioning the video coding block at three quarters of the width of the video coding block.

4. The apparatus according to claim 1, wherein a first sample and a second sample of the set of samples represent adjacent corner positions of the segmentation mask; or
wherein the first sample and the second sample of the set of samples represent positions in corner areas at adjacent corners of the segmentation mask, wherein the corner areas relate to an area extending from the corner by a fourth of the width of the video coding block in horizontal direction and by a fourth of the height of the video coding block in vertical direction.

5. The apparatus according to claim 1, wherein the four to six samples include six samples such that
a third sample and a fourth sample represent border positions at opposite horizontal borders of the segmentation mask and/or represent border positions which are centrally symmetrical to a center of the segmentation mask; and
a fifth sample and a sixth sample represent border positions at opposite vertical borders of the segmentation mask and/or represent border positions which are centrally symmetrical to a center of the segmentation mask.

6. The apparatus according to claim 1, wherein the four to six samples include six samples such that a third sample and a fourth sample represent border positions at opposite horizontal borders of the segmentation mask and/or represent border positions which are centrally symmetrical to a center of the segmentation mask; and
wherein the border areas relate to an area extending from the border by a fourth of the height of the block in vertical direction, and relate to an area extending from the half of the width of the segmentation mask by a fourth of the width of the block in horizontal direction, wherein these horizontal border areas extending from the half of the width extend in opposite horizontal directions to each other; and
wherein a fifth sample and a sixth sample of the set of samples represent positions in border areas at opposite vertical borders of the segmentation mask, wherein the border areas relate to an area extending from the border by a fourth of the width of the block in horizontal direction, and relate to an area extending from the half of the height of the segmentation mask by a fourth of the height of the block in vertical direction, wherein these vertical border areas extending from the half of the height extend in opposite vertical directions to each other.

7. The apparatus according to claim 1, wherein:
a first sample of the set of samples represents a top left corner position of the segmentation mask,
a second sample of the set of samples represents a bottom left or top right corner position of the segmentation mask,
a third sample of the set of samples represents a top border sample at a horizontal N/4, N/2, N−1−N/2 (N/2−1), ¾N or N−1−N/4 (¾N−1) sample position of the segmentation mask,
a fourth sample of the set of samples represents a bottom border sample at a horizontal N/4, N/2, N−1−N/2 (N/2−1), ¾N or N−1−N/4 (¾N−1) sample position of the segmentation mask, approximately at a position centrally symmetric to the horizontal position of the third sample;

a fifth sample of the set of samples represents a left border sample at a vertical N/4, N/2, N−1−N/2 (N/2−1), ¾N or N−1−N/4 (¾N−1) sample position of the segmentation mask, and
a sixth sample of the set of samples represents a right border sample at a vertical N/4, N/2, N−1−N/2 (N/2−1), ¾N or N−1−N/4 (¾N−1) sample position of the segmentation mask, approximately at a position centrally symmetric to the vertical position of the fourth sample.

8. The apparatus according to claim 1, wherein the samples have binary values for indicating the video coding block partitions.

9. The apparatus according to claim 8, wherein the processor is further adapted to invert the binary values of the samples.

10. The apparatus according to claim 1, wherein the processor is further adapted to down-sample a spatial resolution of the segmentation mask by a predetermined down-sampling factor.

11. The apparatus according to claim 1, wherein the video coding block comprises texture information and depth information, wherein a sample of the depth information indicates a depth or disparity of a sample of the texture information; and
wherein the processor is adapted to obtain the values of the set of segmentation mask samples based on the depth information.

12. The apparatus according to claim 1, wherein the apparatus is a video encoder or a video decoder.

13. A method for associating a video block partitioning pattern to a video coding block based on samples of a segmentation mask, the method comprising:
obtaining, by a processor, values of four to six samples from a larger set of samples of the segmentation mask for the video coding block,
wherein each of the four to six samples represents a different position in the segmentation mask, and
wherein the segmentation mask is adapted to define video coding block partitions of the video coding block and at least one of the video coding block partitions have one or more non-rectangular shapes;
selecting, by the processor, the video block partitioning pattern from a group of video block partitioning patterns based on a decision rule that only uses values of the four to six samples; and
associating, by the processor, the selected video block partitioning pattern to the video coding block, wherein patterns in the group of video block partitioning patterns have rectangular shapes.

14. The method according to claim 13, wherein
a first sample of the set of samples represents a top left corner position of the segmentation mask,
a second sample of the set of samples represents a bottom left or top right corner position of the segmentation mask,
a third sample of the set of samples represents a top border sample at a horizontal N/4, N/2, N−1−N/2 (N/2−1), ¾N or N−1−N/4 (¾N−1) sample position of the segmentation mask,
a fourth sample of the set of samples represents a bottom border sample at a horizontal N/4, N/2, N−1−N/2 (N/2−1), ¾N or N−1−N/4 (¾N−1) sample position of the segmentation mask, preferably at an position centrally symmetric to the horizontal position of the third sample, a fifth sample of the set of samples represents a left border sample at a vertical N/4, N/2, N−1−N/2 (N/2−1), ¾N or N−1−N/4 (¾N−1) sample position of the segmentation mask, and a sixth sample of the set of samples represents a right border sample at a vertical N/4, N/2, N−1−N/2 (N/2−1), ¾N or N−1−N/4 (¾N−1) sample position of the segmentation mask, preferably at a position centrally symmetric to the vertical position of the fourth segmentation sample.

15. The method according to claim 13, wherein the video coding block partitions of the video coding block have an arbitrary shape; and wherein the group of video block partitioning patterns comprises at least one video block partitioning pattern selected from the group comprising:
 a video block partitioning pattern for horizontally partitioning the video coding block at one quarter of the height of the video coding block,
 a video block partitioning pattern for horizontally partitioning the video coding block at one half of the height of the video coding block,
 a video block partitioning pattern for horizontally partitioning the video coding block at three quarters of the height of the video coding block,
 a video block partitioning pattern for vertically partitioning the video coding block at one quarter of the width of the video coding block,
 a video block partitioning pattern for vertically partitioning the video coding block at one half of the width of the video coding block, and
 a video block partitioning pattern for vertically partitioning the video coding block at three quarters of the width of the video coding block.

16. A non-transient computer readable medium storing instructions, which when executed by a processor, associate a video block partitioning pattern to a video coding block based on samples of a segmentation mask, the instructions including:

instructions for obtaining values of a subset of samples from a larger set of samples of the segmentation mask for the video coding block,
 wherein each of the four to six samples represents a different position in the segmentation mask, and
 wherein the segmentation mask is adapted to define video coding block partitions of the video coding block and at least one of the video coding block partitions have one or more non-rectangular shapes;
instructions for selecting a video block partitioning pattern a group of video block partitioning patterns based on a decision rule that only uses values of the four to six samples; and
instructions for associating the selected video block partitioning pattern to the video coding block, wherein patterns in the group of video block partitioning patterns having rectangular shapes.

17. The non-transient computer readable medium storing instructions, according to claim 16, wherein the subset of samples comprises:

a first sample of the subset of samples represents a top left corner position of the segmentation mask, a second sample of the subset of samples represents a bottom left or top right corner position of the segmentation mask, a third sample of the subset of samples represents a top border sample at an horizontal N/4, N/2, N−1−N/2 (N/2−1), ¾N or N−1−N/4 (¾N−1) sample position of the segmentation mask, a fourth sample of the subset of samples represents a bottom border sample at an horizontal N/4, N/2, N−1−N/2 (N/2−1), ¾N or N−1−N/4 (¾N−1) sample position of the segmentation mask, preferably at a position centrally symmetric to the horizontal position of the third sample;

a fifth sample of the subset of samples represents a left border sample at a vertical N/4, N/2, N−1−N/2 (N/2−1), ¾N or N−1−N/4 (¾N−1) sample position of the segmentation mask; and a sixth sample of the subset of samples represents a right border sample at a vertical N/4, N/2, N−1−N/2 (N/2−1), ¾N or N−1−N/4 (¾N−1) sample position of the segmentation mask, preferably at a position centrally symmetric to the vertical position of the fourth sample.

18. The non-transient computer readable medium storing instructions, according to claim 16, wherein the group of video block partitioning patterns comprises at least one video block partitioning pattern selected from the group comprising:

a video block partitioning pattern for horizontally partitioning the video coding block at one quarter of the height of the video coding block;

a video block partitioning pattern for horizontally partitioning the video coding block at one half of the height of the video coding block;

a video block partitioning pattern for horizontally partitioning the video coding block at three quarters of the height of the video coding block;

a video block partitioning pattern for vertically partitioning the video coding block at one quarter of the width of the video coding block;

a video block partitioning pattern for vertically partitioning the video coding block at one half of the width of the video coding block; and a video block partitioning pattern for vertically partitioning the video coding block at three quarters of the width of the video coding block.

19. The non-transient computer readable medium storing instructions, according to claim 16, wherein the instructions further include instructions for obtaining the subset of the samples by down-sampling a spatial resolution of the segmentation mask by a predetermined down-sampling factor.

20. The non-transient computer readable medium storing instructions, according to claim 16, wherein the instructions further include instructions for obtaining the values of the subset of samples based on depth information provided by the video coding block.

21. The apparatus according to claim 1, wherein the decision rule comprises a comparison and selecting the video block partitioning pattern comprises comparing the values of pairs of the four to six samples and determining whether the values of each of such pairs are equal or different.

22. The apparatus according to claim 1, wherein the four to six samples are located at the borders and corners of the segmentation mask.

23. The apparatus according to claim 1, wherein the four to six samples are located at the borders of the segmentation mask.

* * * * *